United States Patent
Yasumoto et al.

(10) Patent No.: US 7,422,811 B2
(45) Date of Patent: Sep. 9, 2008

(54) FUEL CELL LIFE PREDICTING DEVICE AND FUEL CELL SYSTEM

(75) Inventors: Eiichi Yasumoto, Kyoto (JP); Shinichi Arisaka, Osaka (JP); Osamu Sakai, Osaka (JP); Hideo Kasahara, Osaka (JP); Shigeyuki Unoki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 618 days.

(21) Appl. No.: 10/990,487

(22) Filed: Nov. 18, 2004

(65) Prior Publication Data

US 2005/0130001 A1    Jun. 16, 2005

(30) Foreign Application Priority Data

Nov. 18, 2003    (JP)    ............... 2003-388354

(51) Int. Cl.
*H01M 8/04*    (2006.01)
*H01M 8/10*    (2006.01)

(52) U.S. Cl. .......................... 429/22; 324/439
(58) Field of Classification Search ............ 429/13, 429/22; 324/439
See application file for complete search history.

(56) References Cited

FOREIGN PATENT DOCUMENTS

| | | |
|---|---|---|
| JP | 01-122570 | 5/1989 |
| JP | 11-097049 | 4/1999 |
| JP | 2002-305008 | 10/2002 |

OTHER PUBLICATIONS

M. Inaba et al.; "Formation of Hydrogen Peroxide at the Cathode in PEFC and Its Effects on the Stability of Nafion"; *The 10th FCDIC Fuel Cell Symposium Proceedings*; May 13-14, 2003, pp. 261-264; Tokyo, Japan.
European Search Report issued in European Patent Application No. EP 04 02 7205, mailed Aug. 6, 2007.
McElroy, J., et al., "SPE Hydrogen/Oxygen Fuel Cells Rigorous Naval Applications", Proceedings of the International Power Sources Symposium. Cherry Hill, Jun. 25-28, 1990, pp. 403-407, vol. SYMP 34, IEEE, New York, USA.
Baldwin, R., et al., "Hydrogen-Oxygen Proton-Exchange Membrane Fuel Cells and Electrolyzers", Journal of Power Sources, Feb. 1, 1990, pp. 399-412, vol. 29 No. 3/4, Elsevier Sequoia, Amsterdam, Netherlands.
Heitner-Wirguin, C., "Recent Advances in Perfluorinated Ionomer Membranes: Structure, Properties and Applications", Journal of Membrane Science, Oct. 30, 1996, pp. 1-33, vol. 120 No. 1, Elsevier Scientific Publ. Company, Amsterdam, Netherlands.

*Primary Examiner*—Gregg Cantelmo
(74) *Attorney, Agent, or Firm*—McDermott Will & Emery LLP

(57) ABSTRACT

There are provided measuring units of measuring the amount of fluoride ions in the waste material from a fuel cell which receives a fuel gas and an oxidizing agent gas containing oxygen to undergo electrochemical reaction by which electricity is generated and a life predicting unit of predicting the life of the fuel cell by the use of the amount of fluoride ions thus measured.

3 Claims, 13 Drawing Sheets

FUEL CELL LIFE PREDICTING DEVICE AND FUEL CELL SYSTEM

BACKGROUND OF THE INVENTION

1. Field of the Invention

The present invention relates to a device of predicting the life of a fuel cell, particularly a polymer electrolyte fuel cell for use in electric supply for portable apparatus, portable electric supply, electric supply for electric car, household cogeneration system, etc. and a fuel cell system.

2. Related Art of the Invention

A polymer electrolyte fuel cell causes the electrochemical reaction of a fuel gas such as hydrogen with an oxidizing agent gas such as air through a gas diffusion electrode to generate electricity. FIG. 13 is a schematic sectional view illustrating an ordinary configuration of such a related art polymer electrolyte fuel cell.

As shown in FIG. 13, the polymer electrolyte fuel cell 120 comprises a gas diffusion layer 101, a catalytic reaction layer 102, a polymer electrolyte membrane 103, a separator 104, a gas flow path 105, a cooling water flow path 107, an electrode 109, MEA 110, a gas sealing material 113, an O-ring 114, etc.

In some detail, the polymer electrolyte membrane 103, which selectively transports hydrogen ions, has a catalytic reaction layer 102 disposed in close contact with both sides thereof. The catalytic reaction layer 102 is mainly composed of a carbon powder having a platinum group metal catalyst supported thereon. The catalytic reaction layer 102 has a pair of gas diffusion layers 101 having both gas permeability and electrical conductivity, which are disposed in close contact with the respective external surface thereof. The gas diffusion layer 101 and the catalytic reaction layer 102 together form an electrode 109.

The electrode 109 has an electrode-electrolyte assembly (hereinafter referred to as "MEA") 110 formed by the electrode 109 and the polymer electrolyte membrane 103 mechanically fixed to the outer side thereof. Adjacent MEA's 110 are electrically connected to each other in series. An electrically-conductive separator 104 having a gas flow path 105 on one side thereof through which a reactive gas is supplied into the electrode 109 and a gas produced by the reaction or extra gas is removed away and disposed of.

The gas flow path 105 may be provided separately from the separator 104 but is normally formed by providing a groove on the surface of the separator 104. On the other surface of the separator 104 is provided a cooling water flow path 107 through which cooling water for keeping the cell temperature constant is circulated. By circulating cooling water through the cooling water flow path 107, heat energy generated by the reaction can be used in the form of hot water or the like.

A gas sealing material 113 or O-ring 114 is provided on the periphery of the electrode 109 with the polymer electrolyte membrane 103 interposed therebetween to prevent hydrogen and air from leaking from the cell and being mixed with each other and prevent cooling water from leaking from the cell.

It is known that a fuel cell degradates with time when operated over an extended period of time. The degradated elements include the electrode catalyst, polymer electrolyte membrane, gas diffusion layer, etc.

As a method of previously detecting such degradation there has been proposed a method which comprises predicting the future drop of output voltage from the change of the output voltage of a fuel cell with time and hence the replacement time of the cell or stack (see, e.g., JP-A-1-122570). In accordance with this method, the degree of drop of output voltage due to excessive wetting of the electrode catalyst or electrolyte and the expected future output voltage are estimated on the basis of the pattern of change of the difference between the output voltage during ordinary operation and the output voltage under the conditions such that the oxygen concentration in the oxidizing agent gas is raised from the ordinary state with time to predict and judge the life of the cell.

Besides the above cited cell life predicting method, there has been proposed a method which comprises predicting the life of a fuel cell using an approximate equation for degradation rate of voltage and operating time with respect to basic operating pattern determined from the measurements of degradation rate of voltage of a fuel cell operated in basic pattern (see, e.g., JP-A-2002-305008). In accordance with this method, an approximate equation for degradation rate of voltage and operating time in basic operating pattern is used to calculate the ordinary voltage drop of the fuel cell and hence the life of the fuel cell.

Though being not a method of predicting the life of a fuel cell, as a method of prolonging the life of a fuel cell there has been a method which comprises increasing the electrolyte membrane thickness of apart of the electrode reaction portion of MEA as compared with other portions to inhibit local creep caused by clamping pressure (see, e.g., JP-A-11-97049). The polymer electrolyte membrane must be used in hydrous state to keep its protonic conductivity. Thus, the polymer electrolyte membrane can easily swell and undergo creep. This proposal is intended to increase the thickness of a part of the electrolyte membrane at the electrode reaction portion, which is remarkably moistened, so that the local drop of the thickness of the membrane due to compressive creep can be inhibited to prolong the life of the fuel cell.

However, the aforementioned method which comprises predicting the future voltage from the change of the output voltage of a fuel cell with time to predict the replacement time of cell or stack can have difficultly making sufficient prediction of suddenly occurring degradation because the life of the fuel cell is predicted from the change of the output voltage of the cell with time. Further, since the change of output voltage with time is judged from the difference between the output voltage during rated operation and the output voltage under the conditions such that the oxygen concentration in the oxidizing agent gas is raised from the ordinary state, it is necessary that the oxygen concentration in the oxidizing agent gas be raised once. Since it is usual to use air as an oxidizing agent gas except for special cases, an oxygen gas bomb must be always provided to raise the oxygen concentration. Moreover, this method is based on the assumption that it is applied to phosphoric acid type fuel cells but doesn't take into account the damage of electrolyte membrane which is likely to occur with polymer electrolyte fuel cells or the like.

The aforementioned method which comprises predicting the life of a fuel cell using an approximate equation for degradation rate of voltage and operating time with respect to basic operating pattern determined from the measurements of degradation rate of voltage of a fuel cell operated in basic pattern can have difficultly making sufficient prediction of sudden degradation behavior causing sudden voltage drop such as damage of polymer membrane similarly to the aforementioned method which comprises predicting the future voltage from the output voltage of a fuel cell.

The aforementioned method which comprises increasing the electrolyte membrane thickness of apart of the electrode reaction portion of MEA as compared with other portions to inhibit local creep caused by clamping pressure is likely to relax creep due to clamping of electrolyte membrane and hence prolong the life of a fuel cell. When the thickness of the polymer electrolyte membrane is increased, an effect of prolonging the life of the fuel cell can be exerted, but it doesn't mean that degradation no longer occurs. Accordingly, it is necessary that some method be used to predict the life of the fuel cell accurately and simply. This proposal has no reference to life prediction.

In other words, the related art method which comprises predicting the future voltage from the change of output voltage of a fuel cell with time to predict the replacement time of cell or stack as proposed in the above cited Patent Reference 1 is disadvantageous in that suddenly occurring degradation of a fuel cell cannot be sufficiently predicted.

The related art method is also disadvantageous in that an oxygen bomb must be always provided.

The related art method is further disadvantageous in that the damage of electrolyte which is likely to occur with polymer electrolyte fuel cells is not taken into account.

One objective of the present invention is to provide a fuel cell life predicting device for predicting the life of a fuel cell by properly judging the degradation of cell performance or the state of degradation of electrolyte membrane and a fuel cell system which addresses the aforementioned problems of the prior art methods.

SUMMARY OF THE INVENTION

The fuel cell life predicting device and the fuel cell system of the invention for accomplishing the aforementioned objective comprises a method which focuses on the amount of specific chemical species contained in the polymer electrolyte membrane of a fuel cell.

As mentioned above, the output voltage generated by a fuel cell can normally be measured with good precision. As the performance of the fuel cell degradates, the voltage of output electricity generated by the fuel cell drops. Accordingly, the life of a fuel cell has heretofore been predicted by measuring the voltage of output electricity generated by the fuel cell as described in the background art.

In the case where the electrolyte membrane degradates and breaks or the like, the degradation/breakage of the fuel cell occurs suddenly. However, the degradation of the fuel cell cannot be sufficiently predicted by the related art methods.

In recent years, it has been noted in studies of enhancement of durability of polymer electrolyte fuel cells that hydrogen peroxide co-produced during the operation of a fuel cell can undergo Fenton reaction or the like to generate hydroxy radicals that degradate the polymer electrolyte membrane (preprint of the 10th FCDIC Fuel Cell Symposium Proceedings, pp. 261-264, 2003). It is reported that this degradation of the polymer electrolyte membrane is presumably attributed to the attack by the hydroxy radicals upon the polymer electrolyte resulting in the severance of the molecular chain thereof.

For example, a phosphoric acid type fuel cell is thought to undergo the increase of the particle diameter of the electrode catalyst or the change of the wetting properties of the electrode catalyst that causes the degradation of cell performance. A polymer electrolyte fuel cell undergoes degradation of perfluorocarbonsulfonic acid membrane (e.g., Nafion film (trade name), produced by Du Pont Inc., USA) as an electrolyte and hence degradation of cell performance. Accordingly, when the polymer electrolyte membrane undergoes fatal damage, the electrolyte membrane breaks, making it likely that the fuel cell can not operate.

These studies focus mainly on the enhancement of durability of fuel cells but have no suggestions on their application to the prediction of the life of fuel cells.

In this respect, the decomposition product of the electrolyte membrane of a fuel cell is essentially formed by various products. It is not easy to completely analyze the decomposition product formed by various products. Therefore, an idea has heretofore taken root that the prediction of the life of a fuel cell should be carried out by measuring the output voltage. No one has considered the idea of predicting the degree of degradation/damage of the electrolyte membrane of a fuel cell from the various decomposition products.

On the contrary, the inventors of the present invention had an idea that the degree of degradation/damage of the electrolyte membrane of a fuel cell may be found by analyzing the decomposition product produced by the decomposition reaction of the fuel cell on the basis of the fact that the decomposition product produced by the decomposition reaction of the electrolyte membrane of the fuel cell, if degraded and damaged, is released with the waste material discharged from the fuel cell. The present inventors then paid attention to the measurement of the amount of specific chemical species contained in the waste material discharged from the fuel cell. In other words, the present inventors thought that more accurate life prediction must be attained by focusing on the degradation of the properties of the electrolyte membrane. Eventually, the present inventors came up with an idea that the life of a fuel cell is predicted by making the use of the measured amount of specific chemical species such as fluoride ion among decomposition products rather than by analyzing all the decomposition products of the fuel cell. The present inventors actually established a method capable of sufficiently accurately predicting the life of a fuel cell even if the degradation of the fuel cell suddenly occurs by measuring the amount of specific chemical species or the corresponding electrical conductivity. The present application has been worked out on the basis of this concept.

The $1^{st}$ aspect of the present invention is a fuel cell life predicting device for predicting the life of a fuel cell comprising at least a membrane-electrode assembly having an anode, a cathode and a polymer electrolyte membrane disposed interposed between said anode and said cathode, wherein there is provided a measuring portion for measuring the amount of chemical species produced by the decomposition reaction of said polymer electrolyte membrane contained in the waste material discharged from said fuel cell during electricity generation and a life predicting portion for predicting the life of said fuel cell by the use of said amount of said chemical species measured by said measuring portion.

The $2^{nd}$ aspect of the present invention is the fuel cell life predicting device as described in the $1^{st}$ aspect of the present invention, wherein said measuring portion measures the decomposed amount of said polymer electrolyte membrane by the use of said amount of said chemical species.

The $3^{rd}$ aspect of the present invention is the fuel cell life predicting device as described in the $1^{st}$ aspect of the present invention, wherein said polymer electrolyte membrane comprises a fluorine-containing polymer material incorporated therein as a constituent and said chemical species measured by said measuring portion are fluoride ions.

Another embodiment of the present invention is a fuel cell life predicting device of the third aspect wherein said life predicting portion calculates the fluoride ion release rate from said measured amount of said fluoride ions and then predicts the life of said fuel cell from said calculated fluoride ion release rate and the amount of fluorine in the polymer electrolyte membrane constituting the fuel cell.

A further embodiment of the present invention is a fuel cell life predicting device of the third aspect wherein said life predicting portion predicts the life of said fuel cell on the basis of the integrated total amount of fluoride ions in said waste material and the amount of fluorine in the polymer electrolyte membrane constituting said fuel cell.

A further embodiment of the present invention is a fuel cell life predicting device of the aforementioned invention wherein said life predicting portion compares the integrated total amount of fluoride ions in said waste material with the amount of fluorine in the polymer electrolyte membrane constituting said fuel cell to judge the expiration of the life of said fuel cell when said integrated total amount of fluoride ions exceeds a predetermined proportion of fluoride ions in the polymer electrolyte membrane.

The $4^{th}$ aspect of the present invention is a fuel cell life predicting device for predicting the life of a fuel cell comprising at least a membrane-electrode assembly having an anode, a cathode and a polymer electrolyte membrane disposed interposed between said anode and said cathode, wherein there is provided a measuring portion for measuring the electrical conductivity corresponding to the amount of chemical species produced by the decomposition reaction of said polymer electrolyte membrane contained in the waste material discharged from said fuel cell during electricity generation and a life predicting portion for predicting the life of said fuel cell by the use of said electrical conductivity measured by said measuring portion.

The $5^{th}$ aspect of the present invention is a fuel cell system comprising the fuel cell life predicting device described in any one of the $1^{st}$ to the $4^{th}$ aspects of the present invention and a fuel cell operating portion of operating said fuel cell.

A further embodiment of the present invention is a fuel cell system comprising a fuel cell life predicting device of the third aspect and a fuel cell operating portion of operating said fuel cell, wherein said measuring portion collects fluoride ions in said waste material and measures the amount thereof at regular intervals and said life predicting portion predicts the life of said fuel cell on the basis of the measured amount of fluoride ions and then judges the time to replace said fuel cell on the basis of said results of prediction.

A further embodiment of the present invention is a fuel cell system comprising a fuel cell life predicting device of the fourth aspect, a fuel cell operating portion of operating the fuel cell and an alarm outputting portion of outputting an alarm when the life of said fuel cell predicted by said life predicting portion falls below a predetermined value.

A further embodiment of the present invention is a fuel cell system comprising a fuel cell life predicting device of the fifth aspect, a fuel cell operating portion of operating said fuel cell and an alarm outputting portion of outputting an alarm when said life predicting portion judges that the life of said fuel cell has been expired.

A further embodiment of the present invention is a fuel cell system comprising a fuel cell life predicting device of the aforementioned invention and a fuel cell operating portion for operating said fuel cell.

A further embodiment of the present invention is a fuel cell system of the aforementioned invention comprising an alarm outputting portion which outputs an alarm when the life of said fuel cell predicted by said life predicting portion falls below a predetermined value.

A further embodiment of the present invention is a fuel cell system of the aforementioned invention, wherein said measuring portion collects the waste water from the fuel cell to measure the electrical conductivity thereof at regular intervals and said life predicting portion predicts said life of said fuel cell on the basis of said measured electrical conductivity and then judges the time to replace said fuel cell on the basis of said results of prediction.

A further embodiment of the present invention is a program for the fuel cell life predicting device of the first aspect of allowing the performance of a computer as a life predicting portion which predicts the life of said fuel cell by the use of the amount of chemical species measured by said measuring portion.

A further embodiment of the present invention is a program for the fuel cell life predicting device of the fourth aspect of allowing the performance of a computer as a life predicting portion which predicts the life of said fuel cell by the use of said electrical conductivity measured by said measuring portion.

A further embodiment of the present invention is a recording medium having the program of the aforementioned invention recorded therein which can be processed by a computer.

A further embodiment of the present invention is a fuel cell life predicting method of predicting the life of a fuel cell comprising at least a membrane-electrode assembly having an anode, a cathode and a polymer electrolyte membrane disposed interposed between said anode and said cathode, wherein there are provided a measuring step of measuring the amount of chemical species produced by the decomposition reaction of the polymer electrolyte membrane contained in the waste material discharged from said fuel cell during electricity generation and a life predicting step of predicting the life of said fuel cell by the use of said amount of said chemical species measured by said measuring portion.

A further embodiment of the present invention is a fuel cell life predicting method of the aforementioned invention, wherein said measuring step measures the decomposed amount of said polymer electrolyte membrane by the use of said amount of said chemical species.

A further embodiment of the present invention is a fuel cell life predicting method of the aforementioned invention, wherein said polymer electrolyte membrane comprises a fluorine-containing polymer material as a constituent and said chemical species to be measured at said measuring step are fluoride ions.

A further embodiment of the present invention is a fuel cell life predicting device of predicting the life of a fuel cell comprising at least a membrane-electrode assembly having an anode, a cathode and a polymer electrolyte membrane disposed interposed between said anode and said cathode, wherein there are provided a measuring step of measuring the electrical conductivity corresponding to the amount of chemical species produced by the decomposition reaction of said polymer electrolyte membrane contained in the waste material discharged from said fuel cell during electricity generation and a life predicting step of predicting the life of said fuel cell by the use of said electrical conductivity measured at said measuring step.

As mentioned above, it is believed that when the polymer electrolyte membrane is degradated under the attack of hydroxy radicals or for like reasons, fluorine which is a main component constituting the membrane is released with the drain water in the off-gas. The present application predicts the life of a fuel cell by making use of the amount of specific chemical species such as fluoride ion.

In accordance with the invention, a fuel cell life predicting device can be provided which can predict the life of a fuel cell by measuring the amount of specific chemical species such as fluoride ions in the off-gas during the operation of the fuel cell or corresponding electrical conductivity and then comparing it with the amount of specific chemical species such as fluorine in the polymer electrolyte membrane.

PREFERRED EMBODIMENTS OF THE INVENTION

Embodiments of implementation of the invention will be described in connection with the attached drawings.

Embodiment 1

The embodiment 1 of the invention will be described below.

Figure 1:
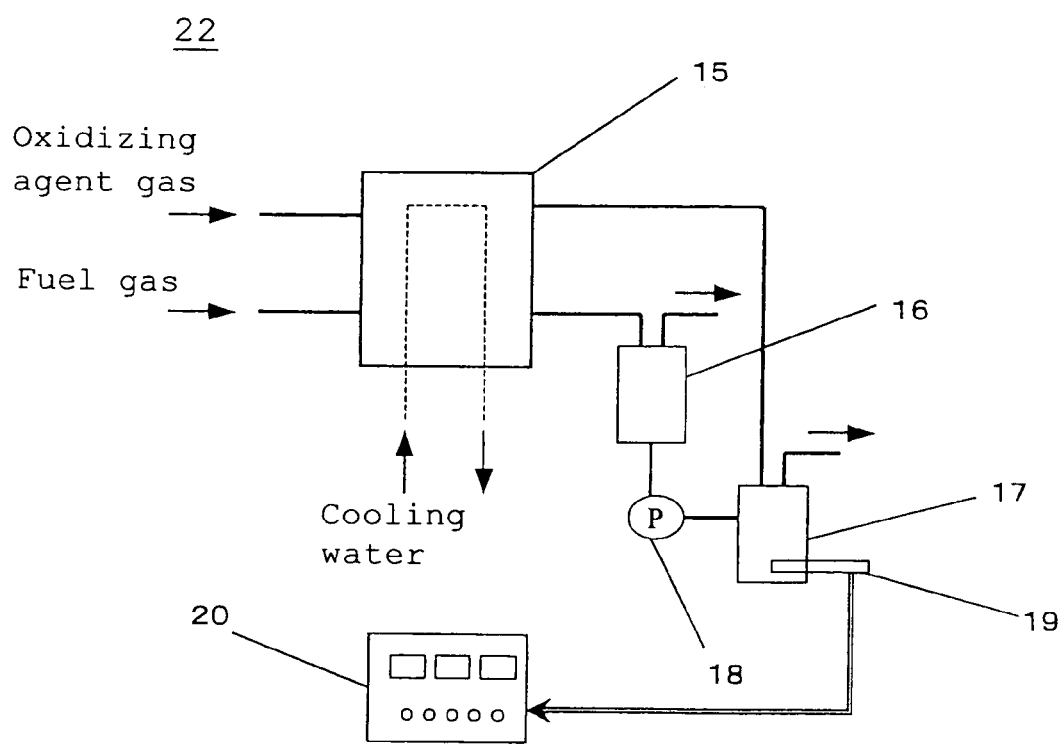
FIG. 1 is a diagram illustrating the configuration of a fuel cell system according to embodiment 1 of implementation of the invention.

FIG. 1 illustrates the configuration of a fuel cell system 22 according to the embodiment 1 of the invention.

The fuel cell system 22 according to the embodiment 1 of the invention comprises a fuel cell 15, an anode drain tank 16, a cathode drain tank 17, a pump 18, an F ion meter 19 and a controlling portion 20.

Figure 2:
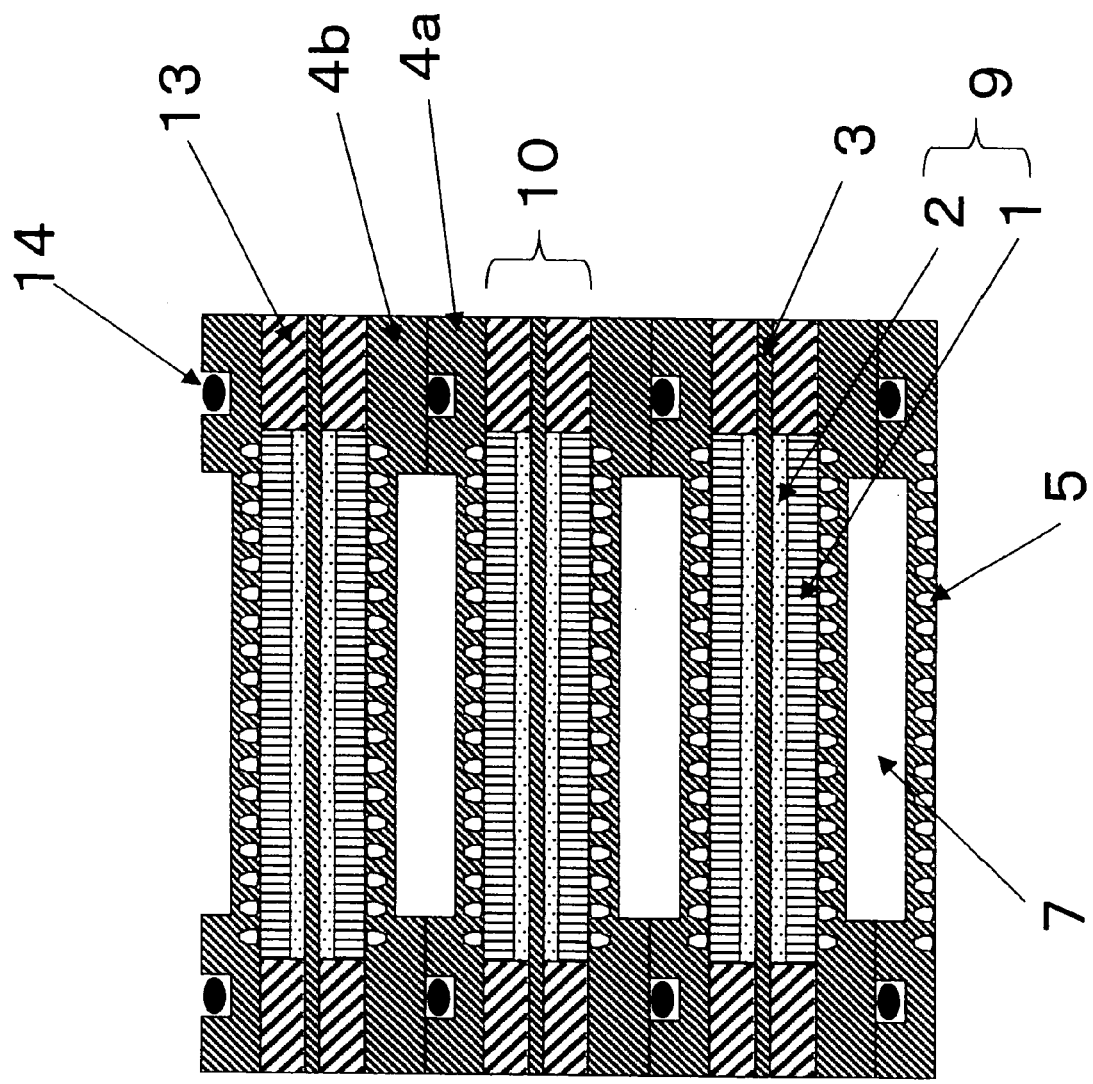
FIG. 2 is a schematic sectional view illustrating the configuration of a polymer electrolyte fuel cell according to the embodiments 1 and 2 of the invention.

FIG. 2 is a specific sectional view illustrating the configuration of a polymer electrolyte fuel cell 15 according to the embodiment 1 of the invention. FIG. 2 will be further described later. The anode drain tank 16 is a tank adapted to cause water and water vapor to be released from the waste material contained in the anode waste gas (containing both liquid and gaseous waste materials) discharged from the anode of the fuel cell 15. The cathode drain tank 17 is a tank adapted to cause water and water vapor to be released from the waste material contained in the cathode waste gas (containing both liquid and gaseous waste materials) discharged from the cathode of the fuel cell 15. The pump 18 is a unit for supplying drain water stored in the anode drain tank 16 into the cathode drain tank 17. The F ion meter 19 is a unit for detecting the amount of F ions in the drain water in the cathode drain tank 17. The controlling portion 20 is a unit for controlling the operation of the fuel cell 15 as well as predicting the life of the fuel cell 15. The unit of predicting the life of the fuel cell 15 in the controlling portion 20 may be fixed in the interior of the fuel cell system 22 or may be detachably provided in the fuel cell system 22.

The fuel cell 15 will be further described in connection with FIG. 2. As shown in FIG. 2, the fuel cell 15 comprises a gas diffusion layer 1, a catalytic reaction layer 2, a polymer electrolyte membrane 3, a separator 4, a gas flow path 5, a cooling water flow path 7, an electrode 9, MEA 10, a gas sealing material 13, an O-ring 14, etc.

In some detail, the polymer electrolyte membrane 3, which selectively transports hydrogen ion, has a catalytic reaction layer 2 disposed in close contact with both sides thereof. The catalytic reaction layer 2 is mainly composed of a carbon powder having a platinum group metal catalyst supported thereon. The catalytic reaction layer 2 has a pair of gas diffusion layers 1 having both gas permeability and electrical conductivity disposed in close contact with the respective external surface thereof. The gas diffusion layer 1 and the catalytic reaction layer 2 together form an electrode 9.

One of the electrodes 9 is an electrode into which a fuel gas is supplied and is called the anode. The other of the electrodes 9 is an electrode into which an oxidizing agent gas is supplied and is called the cathode.

The anode and cathode of the invention are not limited to the configuration comprising a gas diffusion layer 1 disposed in close contact with the external surface of a catalytic reaction layer 2. The anode and cathode of the invention may have any configuration so far as they have a gas diffusion electrode having gas diffusibility. In some detail, the anode and cathode each may be formed by a catalyst layer having gas diffusibility or may be a laminated material comprising the aforementioned catalytic reaction layer 2 formed on the gas diffusion layer 1. The anode or cathode may be a laminated material comprising one or more other layers (e.g., layer made of a porous material having gas diffusibility, electronic conductivity and water repellency) disposed interposed between the gas diffusion layer and the catalytic reaction layer 2.

The electrode 9 has a membrane-electrode assembly (hereinafter referred to as "MEA") 10 formed by the electrode 9 and the polymer electrolyte membrane 3 mechanically fixed to the outer side thereof. Adjacent MEAs 10 are electrically connected to each other in series. An electrically-conductive separator 4 having a gas flow path 5 on one side thereof through which a reactive gas is supplied into the electrode 9 and a gas produced by the reaction or extra gas is remove away is disposed.

The gas flow path 5 may be provided separately from the separator 4 but is normally formed by providing a groove on the surface of the separator 4. On the other surface of the separator 4, a cooling water flow path 7 is provided through which cooling water for keeping the cell temperature constant is circulated. By circulating cooling water through the cooling water flow path 7, heat energy generated by the reaction can be used in the form of hot water or the like.

A gas sealing material 13 or O-ring 14 is provided on the periphery of the electrode 9 with the polymer electrolyte membrane 3 interposed therebetween to prevent hydrogen and air from leaking from the cell and being mixed with each other and to prevent cooling water from leaking from the cell.

The F ion meter 19 according to the present embodiment is an example of the measuring portion of the invention. The controlling portion 20 according to the present embodiment is an example of the life predicting portion of the invention. The controlling portion 20 according to the present embodiment is also an example of the fuel cell operating portion of the invention.

The operation of the present embodiment of implementation of the invention will be described hereinafter.

As shown in FIG. 1, the fuel cell 15 receives an oxidizing agent gas and a fuel gas. During the operation of the fuel cell system 22, the fuel cell 15 causes the oxidizing agent gas and the fuel gas thus supplied to react with each other to generate electricity. When the oxidizing agent gas and the fuel gas react with each other, heat is generated. Therefore, cooling water is circulated through the fuel cell 15 to cool the fuel cell 15.

The anode (electrode 9 of FIG. 2 into which the fuel gas is supplied) of the fuel cell 15 discharges anode waste gas (containing liquid and gaseous waste materials) to the anode drain tank 16. The anode drain tank 16 causes waste materials (water and water vapor) contained in the anode waste gas to be released with the drain water stored in the anode drain tank 16.

The cathode (electrode 9 of FIG. 2 into which the oxidizing agent gas is supplied) of the fuel cell 15 discharges cathode waste gas (containing liquid and gaseous waste materials) to the cathode drain tank 17. The anode drain tank 17 causes waste materials (water and water vapor) contained in the cathode waste gas discharged from the cathode of the fuel cell 15 to be released with the drain water stored in the cathode drain tank 17.

On the other hand, the pump 18 supplies the drain water stored in the anode drain tank 16 into the cathode drain tank 17. Accordingly, the drain water stored in the cathode drain tank 17 has the waste materials both from the cathode waste gas and the anode waste gas released therewith.

The cathode drain tank 17 has an F ion meter 19 attached thereto for measuring the amount of fluoride ions contained in the drain water in the cathode drain tank 17. The F ion meter 19 is adapted to measure the amount of fluoride ions contained in the drain water in the cathode drain tank 17.

In some detail, the anode waste gas and the cathode waste gas are collected in the anode drain tank 16 and the cathode drain tank 17, respectively. The anode drain water is passed to the cathode drain tank 17 by the pump 18. The F ion meter 19 measures the total amount of fluoride ions in the drain water collected in the cathode drain tank 17 with time.

Subsequently, the controlling portion 20 predicts the remaining life of the fuel cell from the amount of fluoride ions detected by the F ion meter 19. In some detail, the controlling portion 20 calculates the rate of release of fluoride ions from the amount of fluoride ions measured by the F ion meter 19 and the collection time. Under the conditions such that the rate of release of fluoride ions is constant, the controlling portion 20 predicts the remaining life of the fuel cell 15 by the following equation (1):

$$L = (A \times F/V) - Lt \quad (1)$$

where
L: Remaining life (h) of fuel cell;
F: Weight (g) of F in polymer electrolyte membrane;
V: Rate of release of fluoride ions (g/h);
A: Coefficient;
Lt: Operating time (h)

The equation (1) and the remaining life of the fuel cell 15 will be further described later.

The controlling portion 20 displays the remaining life of the fuel cell 15 thus predicted on a remaining life meter mounted on the fuel cell controlling portion 20.

While the embodiment 1 of implementation of the invention has been described with reference to the case where the controlling portion 20 displays the remaining life predicted on the remaining life meter mounted on the fuel cell controlling portion 20, the invention is not limited thereto. The controlling portion 20 may have an alarm buzzer mounted thereon so that when the remaining life predicted by the controlling portion 20 falls below a predetermined value, an alarm is sounded to notify the operator to replace the fuel cell. Alternatively, it may be arranged such that when the remaining life predicted by the controlling portion 20 falls below the predetermined value, an alarm lamp is lighted or the output of the fuel cell 15 is automatically lowered. From the standpoint of safety, the fuel cell system 22 itself may be shut down. Alternatively, it may be arranged such that when the remaining life predicted falls below the predetermined value, the controlling portion 20 automatically gives an alarm to the maintenance company through the internet, telephone line or the like so that the fuel cell system 22 can be maintained at the proper time.

While the embodiment 1 of implementation of the invention has been described with reference to the case where the F ion meter 19 is used to measure the amount of fluoride ions, the invention is not limited thereto. Though large in size and expensive, an ion chromatograph may be used instead of F ion meter 19 to measure the amount of fluoride ions.

Further, in the case of the fuel cell cogeneration system, a communication system may be used to transmit the remaining life to the predetermined maintenance company to perform proper maintenance. In the case where the F ion meter 19 is not mounted, the drain water may be collected and analyzed at regular intervals to estimate proper maintenance time by a plural point measurement method.

Moreover, in the case where the remaining life of the fuel cell 15 falls below the predetermined value, the maintenance company or the like which has been previously informed of the replacement time of fuel cell stack can replace the stack of fuel cell 15 when the replacement time for the stack is reached.

Equation (1) and the process of predicting the remaining life of the fuel cell 15 will be further described hereinafter.

The structural formula of the polymer electrolyte membrane to be normally used in polymer fuel cells is represented by the following chemical formula 1:

[Chemical Formula 1]

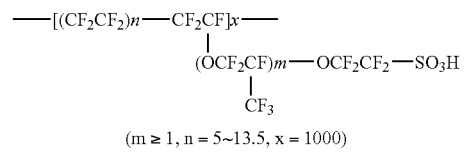

(m ≥ 1, n = 5~13.5, x = 1000)

The aforementioned chemical formula represents an ordinary structure of Nafion film (produced by Du Pont Inc.). Though different in structural formula by film manufacturer, the film of the aforementioned structural formula has a F (fluorine) content of from 60% to 70% based on the total weight of the film as calculated from the structural formula. The fuel cell 15 shown in FIG. 2 was operated under different conditions (A to D).

Figure 3:
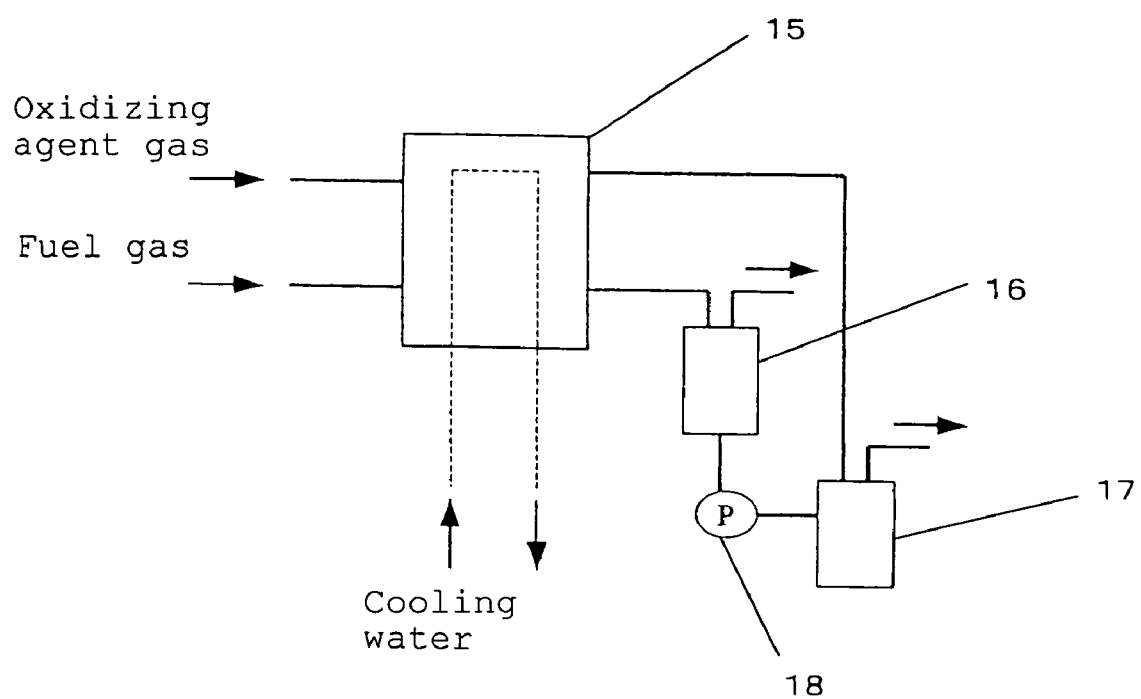
FIG. 3 is a diagram illustrating the configuration of apart of the fuel cell system according to the embodiments 1 and 2 of the invention.

FIG. 3 is a diagram illustrating a part of the fuel cell system according to the embodiment 1 of the invention. In some detail, FIG. 3 illustrates portions of fuel cell 15, cathode drain tank 16, anode drain tank 17 and pump 18 in the fuel cell system 22 of the embodiment 1 of the invention.

As shown in FIG. 3, the anode waste gas and the cathode waste gas are collected in the anode drain tank 16 and the cathode drain tank 17, respectively. The anode drain water is passed to the cathode drain tank 17 by a pump. The total amount of fluoride ions in the drain water collected is measured with time. The rate of release of fluoride ions is then calculated from the amount of fluoride ions and the collection time.

Figure 4:
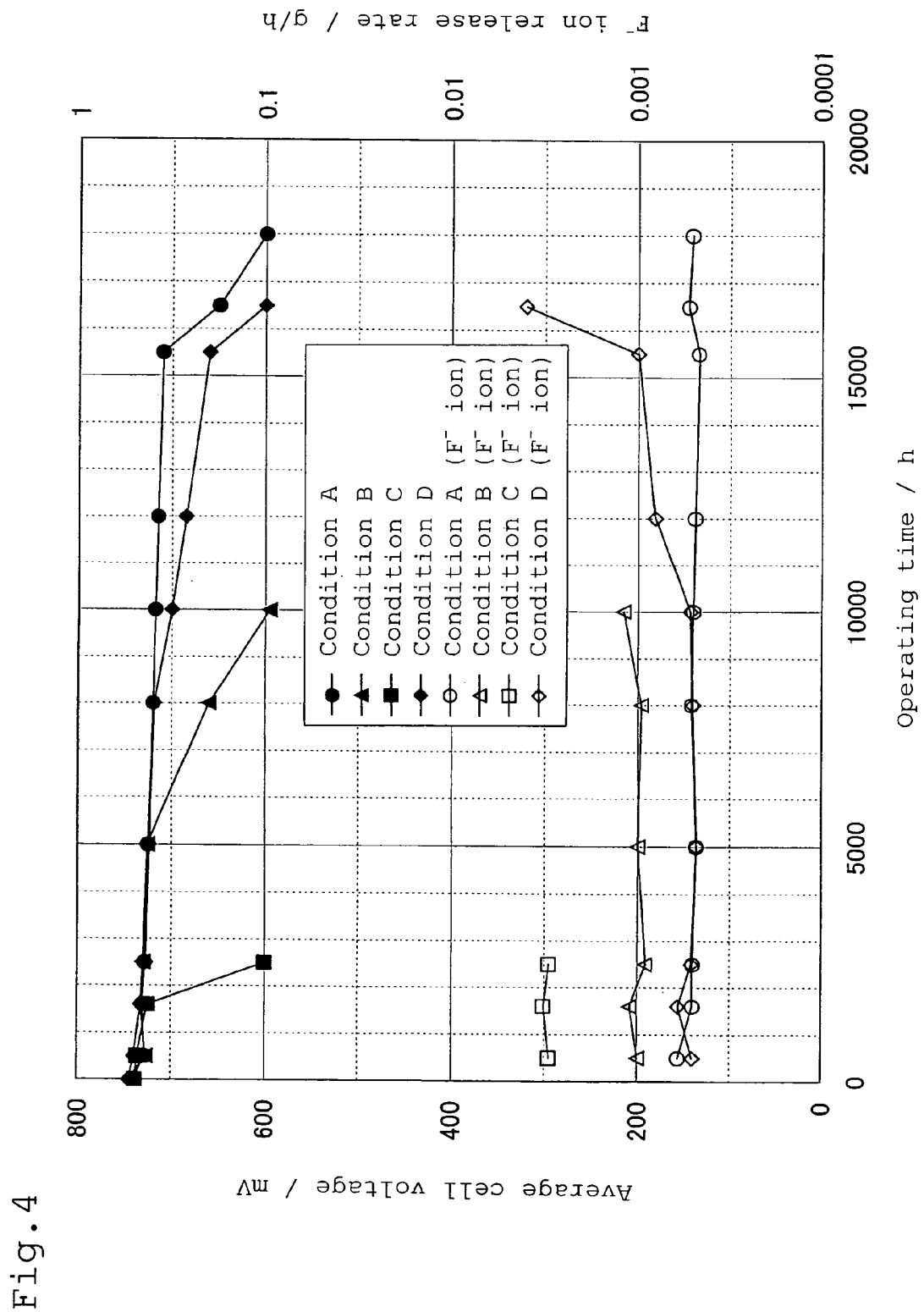
FIG. 4 is a graph illustrating an example of the characteristics of a fuel cell used in the fuel cell system according to the embodiment 1 of the invention.

The relationship between the output voltage of the fuel cell and the released amount of fluoride ions during this procedure is shown in FIG. 4. In other words, FIG. 4 is a graph illustrating an example of the characteristics of the fuel cell used in the fuel cell system according to the embodiment 1 of the invention. Under any condition, the fuel cell shows a sudden drop of output voltage and is disabled in operation at certain time. The fuel cell exhibits different rates of release of fluoride ions under different operating conditions. The higher the rate of release of fluoride ions is, the earlier the drop in the output voltage. Under the condition D, the rate of release of fluoride ions is not constant but gradually rises.

Figure 5:
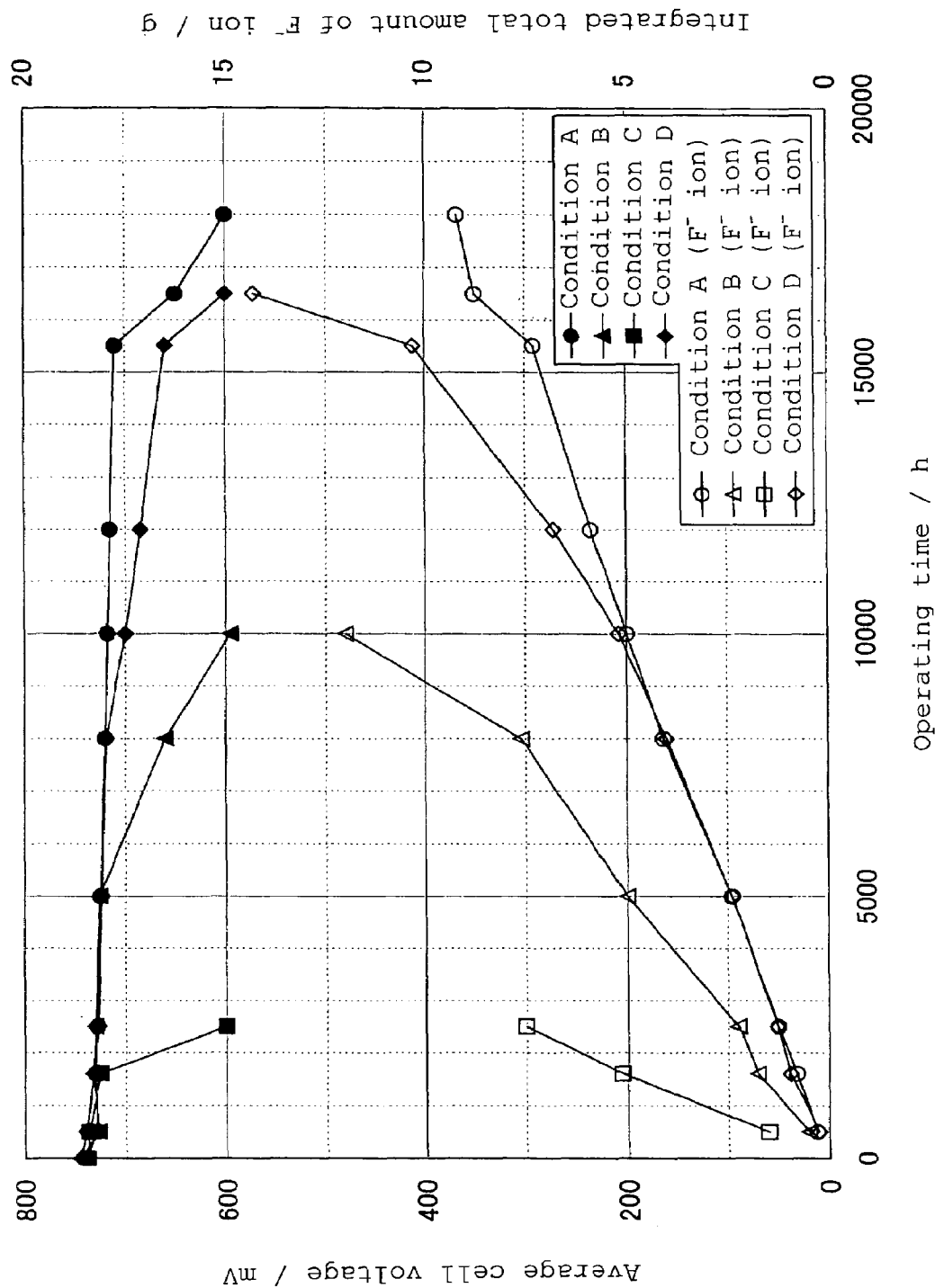
FIG. 5 is a graph illustrating another example of the characteristics of a fuel cell used in the fuel cell system according to the embodiment 1 of the invention.

FIG. 5 is the same as FIG. 4 except that the rate of release of fluoride ions is replaced by the integrated total amount of fluoride ions. In some detail, FIG. 5 is a graph illustrating an example of the characteristics of the fuel cell used in the fuel cell system according to the embodiment 1 of the invention. As can be seen in FIG. 5, the integrated total amount of fluoride ions at the time of drop of output voltage is almost constant, i.e., about 7.5 g under any conditions. It is also clear from FIG. 5 that the integrated total amount of fluoride ions at the time of the drop in the output voltage is about 30% of the amount of fluorine contained in the polymer electrolyte membrane.

The life of the fuel cell can be predicted on the basis of the aforementioned experimental results in the following manner.

In some detail, under the conditions A to C, in which the rate of release of fluoride ions is constant, the aforementioned equation (1) can be derived as a method of predicting the life of a fuel cell. The equation (1) will be described again below.

$$L = (A \times F/V) - Lt \quad (1)$$

where

L: Remaining life (h) of fuel cell;
F: Weight (g) of F in polymer electrolyte membrane;
V: Rate of release of fluoride ions (g/h);
A: Coefficient;
Lt: Operating time (h)

Under the conditions A to C, in which the rate of release of fluoride ions is constant, the integrated amount of fluoride ions at the time of the drop in the output voltage is 30% of the amount of fluorine in the polymer electrolyte membrane. Thus, the coefficient A is 0.3. This coefficient varies with the kind, thickness and size of the polymer electrolyte membrane used, the kind and supported amount of the electrode catalyst, etc. The use of this predicting equation makes it possible to predict the life of the fuel cell. While the present embodiment has been described with reference to the case where the sum of the amount of fluorine ion in the anode waste gas and the cathode waste gas is used in calculation, any one of the amount of fluorine ion in the anode waste gas and the cathode waste gas may be measured if the amount of the anode waste gas and the cathode waste gas are constant.

Under the condition D, equation (1) cannot be used, but the life of the fuel cell can be judged by calculating the integrated total amount of fluoride ions at regular intervals and comparing it with the amount of fluorine in the polymer electrolyte membrane. For example, when the comparison of the integrated total amount of fluoride ions with the amount of fluorine in the polymer electrolyte membrane shows that the integrated total amount of fluoride ions has exceeded a predetermined proportion of fluorine in the polymer electrolyte membrane, it can be judged that the life of the fuel cell has expired.

The term "expiration of the life of the fuel cell 15" as used herein doesn't mean that the fuel cell 15 can no longer be used. The expiration of the life of the fuel cell 15 can be arbitrarily predetermined. In general, the expiration of the life of the fuel cell 15 is predetermined some time earlier than the time at which the fuel cell 15 can no longer been used. This is because it is necessary to leave a marginal time to perform maintenance, including the replacement of stack of fuel cell 15, since the judgment of the expiration of the life of the fuel cell 15.

While the fuel cell system 22 of FIG. 1 has been described with reference to the case where the controlling portion 20 predicts the remaining life of the fuel cell 15 using the equation (1) under the conditions such that the rate of release of fluoride ions is constant, the invention is not limited thereto. Under the conditions such that the rate of release of fluoride ions is not constant, the controlling portion 20 can use a method involving the use of the integrated total amount of fluoride ions under the conditions such that the rate of release of fluoride ions is not constant to predict the life of the fuel cell.

In other words, in this case, the controlling portion 20 judges the life of the fuel cell by calculating the integrated total amount of released fluoride ions at regular intervals and comparing it with the amount of fluorine in the polymer electrolyte membrane. For example, the controlling portion 20 judges the expiration of the life of the fuel cell when the integrated total amount of fluoride ions exceeds the predetermined proportion of fluorine in the polymer electrolyte membrane.

The equation (1) is a predicting equation derived for the total amount of fluorine in the polymer electrolyte membrane. However, if the material constituting the polymer electrolyte membrane remains the same, the total amount of fluorine in the polymer electrolyte membrane can be replaced by the weight of the polymer electrolyte. In this case, the equation (1) is multiplied by the proportion of fluorine in the polymer electrolyte membrane as another coefficient.

When the integrated total amount of polymer electrolyte in the waste material from the fuel cell is the same as the amount of the polymer electrolyte constituting the fuel cell, the fuel cell can no longer act as a fuel cell. Even before the integrated total amount of polymer electrolyte remains the same, when the weight of the polymer electrolyte decreases, hydrogen which is a raw material gas and air can be mixed with each other through the polymer electrolyte membrane to drastically lower the cell voltage, making it impossible for the fuel cell to perform as desired. The life of a fuel cell is a design factor that cannot be unequivocally defined because the reference thereof varies with the form or method of using the fuel cell. Accordingly, the life of the fuel cell can be thus predicted as much as the number of various fuel cells, operating conditions, etc. Further, the life of the fuel cell can be difficult to define unequivocally because it varies with the kind and thickness of the polymer electrolyte membrane, etc. However, in the case where as the polymer electrolyte membrane there is used a fluorine-based resin, the life of the fuel cell can be predicted from the integrated total amount of fluoride ions in the waste material and the amount of fluorine in the polymer electrolyte. For example, the polymer electrolyte membrane to be used may be previously examined for the relation between the integrated total amount of fluoride ions and the cell voltage. The percentage of the total amount of fluoride ions integrated until the cell voltage drops by 10% or more of the initial value in the amount of fluorine in the polymer electrolyte can be used to predict the life of the fuel cell.

In the foregoing description, the amount of fluorine ions in the anode waste gas and/or cathode waste gas is determined. The anode waste gas and/or cathode waste gas contains both waste material discharged from the fuel cell in gaseous form and waste material discharged from the fuel cell in liquid form.

The anode waste gas and/or cathode waste gas according to the present embodiment is an example of the waste material of the invention. The chemical species produced by the decomposition reaction of the polymer electrolyte membrane of the invention are not necessarily fluoride ions according to the present embodiment. The chemical species produced by the decomposition reaction of the polymer electrolyte membrane of the invention may be any decomposition products produced by the decomposition reaction of the polymer electrolyte membrane which are chemical species containing elements constituting the polymer electrolyte membrane. These chemical species may be either in the form of ions or in the form of radicals so far as they can be quantitatively determined.

Further, the chemical species produced by the decomposition reaction of the polymer electrolyte membrane of the invention are not necessarily fluoride ions according to the present embodiment but may be chemical species containing sulfur (e.g., $SO_4^{2-}$) or carbon. In other words, the chemical species produced by the decomposition reaction of the polymer electrolyte membrane of the invention may be any chemical species which can be measured for the life of the fuel cell.

While the present embodiment has been described with reference to the case where the amount of fluoride ions in the waste material from the fuel cell is measured, the invention is not limited thereto. In the case where the polymer electrolyte membrane of the fuel cell is formed by materials other than fluorine, the amount of the polymer electrolyte constituting the polymer electrolyte membrane in the waste material from the fuel cell or elements constituting the polymer electrolyte may be measured instead of fluoride ions. Alternatively, the amount of the polymer electrolyte constituting MEA in the waste material from the fuel cell can be measured to exert the same effect as in the present embodiment.

Embodiment 2

The embodiment 2 of the invention will be describe hereinafter.

Figure 6:
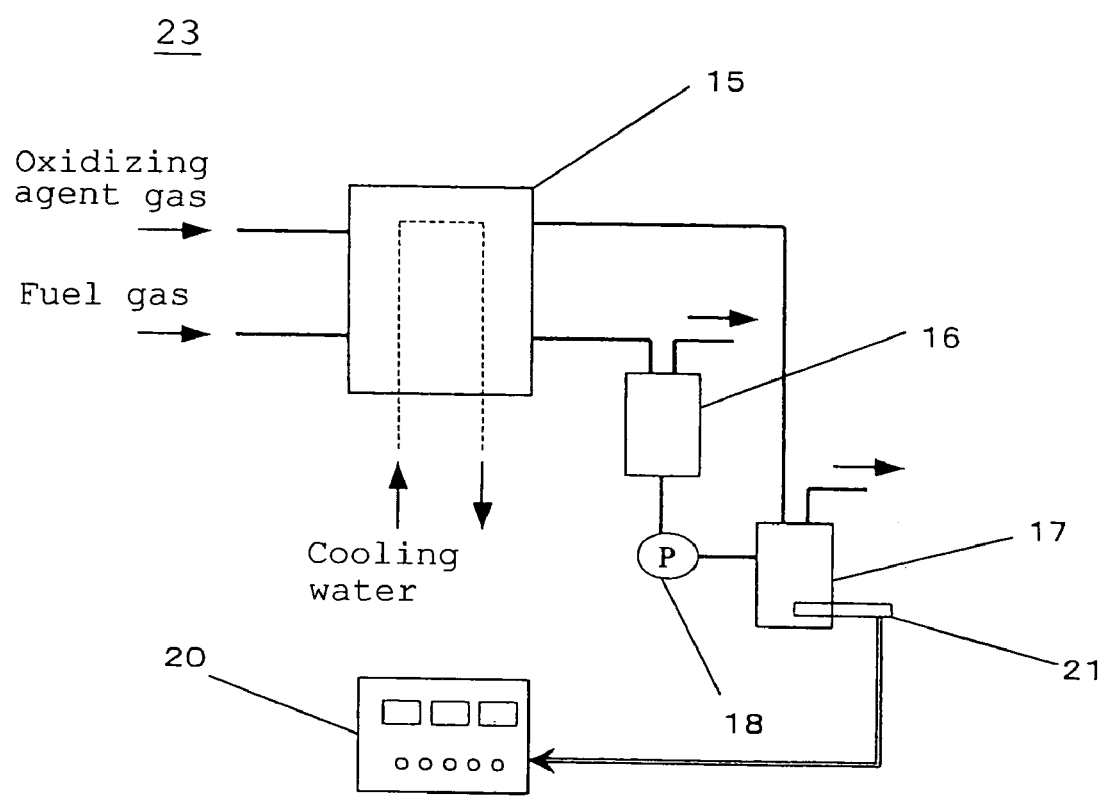
FIG. 6 is a diagram illustrating the configuration of the fuel cell system according to the embodiment 2 of the invention.

FIG. 6 illustrates the configuration of a fuel cell system 23 according to the embodiment 2 of the invention.

The fuel cell system 23 according to the embodiment 2 of the invention comprises an electrical conductivity meter 21 instead of the F ion meter 19 of the fuel cell system 22 according to the embodiment 1 of the invention.

The electrical conductivity meter 21 is a unit of measuring the electrical conductivity of the drain water in the cathode drain tank 17.

The fuel cell system 23 according to the embodiment 2 of the invention is the same as the fuel cell system 22 according to the embodiment 1 of the invention except for the aforementioned configuration.

The electrical conductivity meter 21 according to the present embodiment is an example of the measuring portion of the invention. The controlling portion 20 according to the present embodiment is an example of the life predicting portion of the invention. The controlling portion 20 according to the present embodiment is also an example of the fuel cell operating portion of the invention.

The present embodiment will be further described hereinafter focusing on the difference in operation between the present embodiment and the embodiment 1.

The fuel cell 15 is operated in the same manner as in the embodiment 1 of the invention. The pump 18 supplies the drain water stored in the anode drain tank 16 into the cathode drain tank 17. Accordingly, the drain water stored in the cathode drain tank 17 has both the waste materials from the cathode waste gas and anode waste gas released therewith as in the embodiment 1 of the invention.

The cathode drain tank 17 has an electrical conductivity meter 21 mounted thereon for measuring the electrical conductivity of the drain water in the anode waste gas and cathode waste gas. The electrical conductivity meter 21 measures the electrical conductivity of the drain water in the anode waste gas and cathode waste gas. The controlling portion 20 predicts the remaining life of the fuel cell from the integrated value of electrical conductivity detected by the electrical conductivity 21 under the conditions such that the electrical conductivity remains almost the same using the following equation (2)

$$L=(B \times A \times F/S)-Lt \qquad (2)$$

where
L: Remaining life (h) of fuel cell;
F: Weight (g) of F in polymer electrolyte membrane;
S: Electrical conductivity (S/cm/h);
A: Coefficient;
B: Correction coefficient;
Lt: Operating time (h)

The equation (2) and the remaining life of the fuel cell 15 will be further described later.

The controlling portion 20 has a remaining life meter mounted thereon for displaying the remaining life thus predicted. The controlling portion 20 displays the remaining life of the fuel cell 15 predicted using the equation (2) on the remaining life meter.

In accordance with the embodiment 2 of the invention, the electrical conductivity meter 21 is used instead of the F ion meter 19. The electrical conductivity meter 21 is relatively inexpensive and thus is advantageous also from the standpoint of cost.

While the embodiment 2 of the invention has been described with reference to the case where the controlling portion 20 displays the remaining life of the fuel cell 15 predicted on the remaining life meter, the invention is not limited thereto. The controlling portion 20 may have an alarm buzzer mounted thereon so that when the remaining life predicted by the controlling portion 20 falls below a predetermined value, an alarm is sounded to notify the operator to replace the fuel cell. Alternatively, it may be arranged such that when the remaining life predicted by the controlling portion 20 falls below the predetermined value, an alarm lamp is lighted or the output of the fuel cell 15 is automatically lowered. From the standpoint of safety, the fuel cell system 22 itself may be shut down.

Further, in the case of the fuel cell cogeneration system, a communication system may be used to transmit the remaining life to the predetermined maintenance company to perform proper maintenance. In the case where the electrical conductivity meter 21 is not mounted, the drain water may be collected and analyzed at regular intervals to estimate proper maintenance time by a plural point measurement method.

The equation (2) and the remaining life of the fuel cell 15 will be further described hereinafter.

The fuel cell shown in FIG. 2 was operated under different conditions (A to D) as in the embodiment 1 of the invention.

FIG. 3 illustrates portions of fuel cell 15, cathode drain tank 16, anode drain tank 17 and pump 18 in the fuel cell system 22 of the embodiment 1 of the invention.

Figure 7:
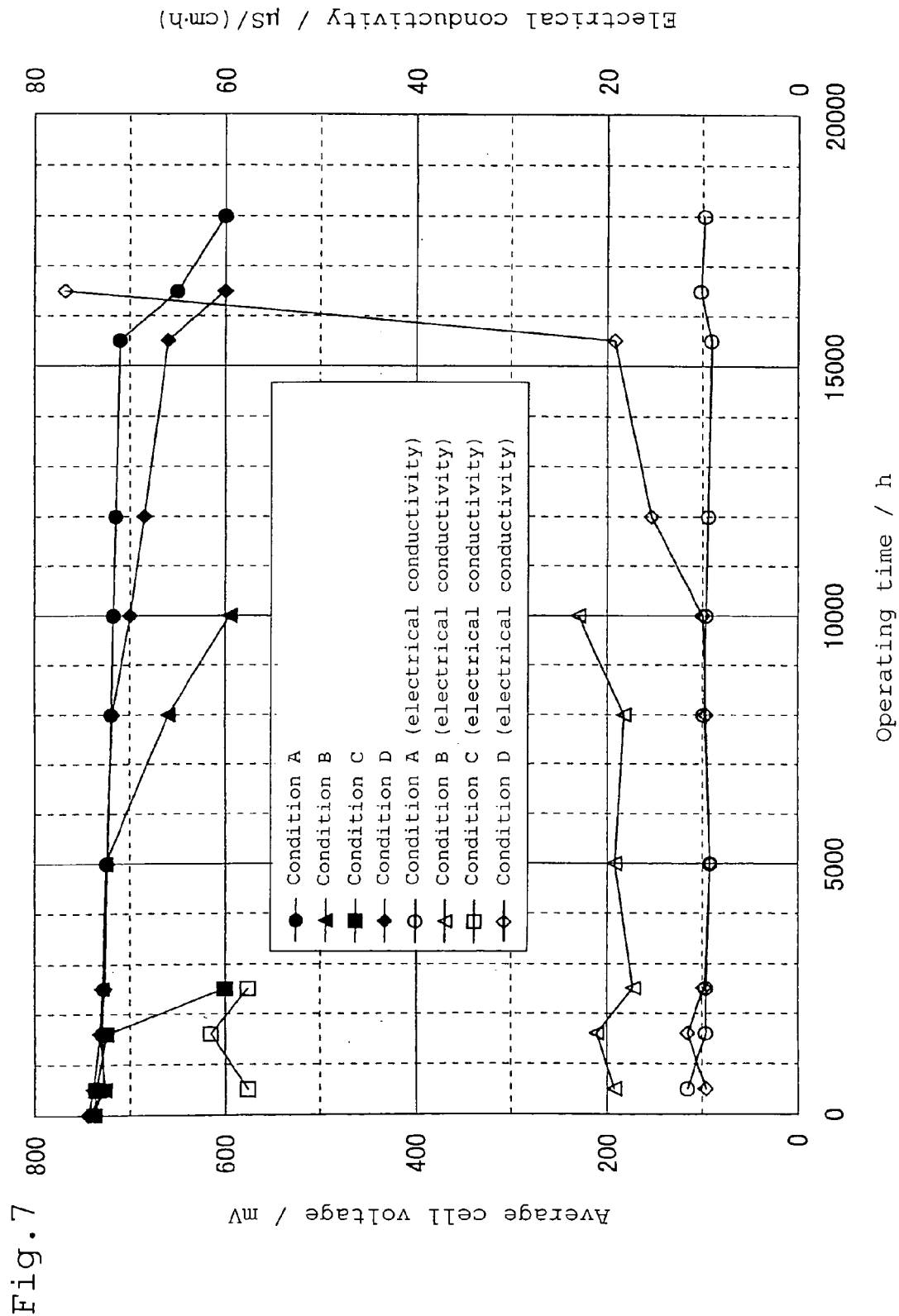
FIG. 7 is a graph illustrating an example of the characteristics of a fuel cell used in the fuel cell system according to the embodiment 2 of the invention.

As shown in FIG. 3, the electrical conductivity of the drain water collected in the cathode drain tank 17 was measured with time. The results of examination of electrical conductivity and output voltage of fuel cell with respect to operating time are shown in FIG. 7. In other words, FIG. 7 is a graph illustrating an example of the characteristics of the fuel cell used in the fuel cell system according to the embodiment 2 of the invention. The dispersion of electrical conductivity is slightly greater than that of rate of release of fluoride ions. The electrical conductivity is represented by the sum of the amount of ions contained in the drain water. The fuel cells having a relatively high electrical conductivity began to show a output voltage drop earlier, giving results corresponding to the behavior of the rate of release of fluoride ions. Under the operating condition D, the fuel cells showed a tendency to have a rise of electrical conductivity with time. This is presumably because the released amount of fluoride ions raised.

Figure 8:
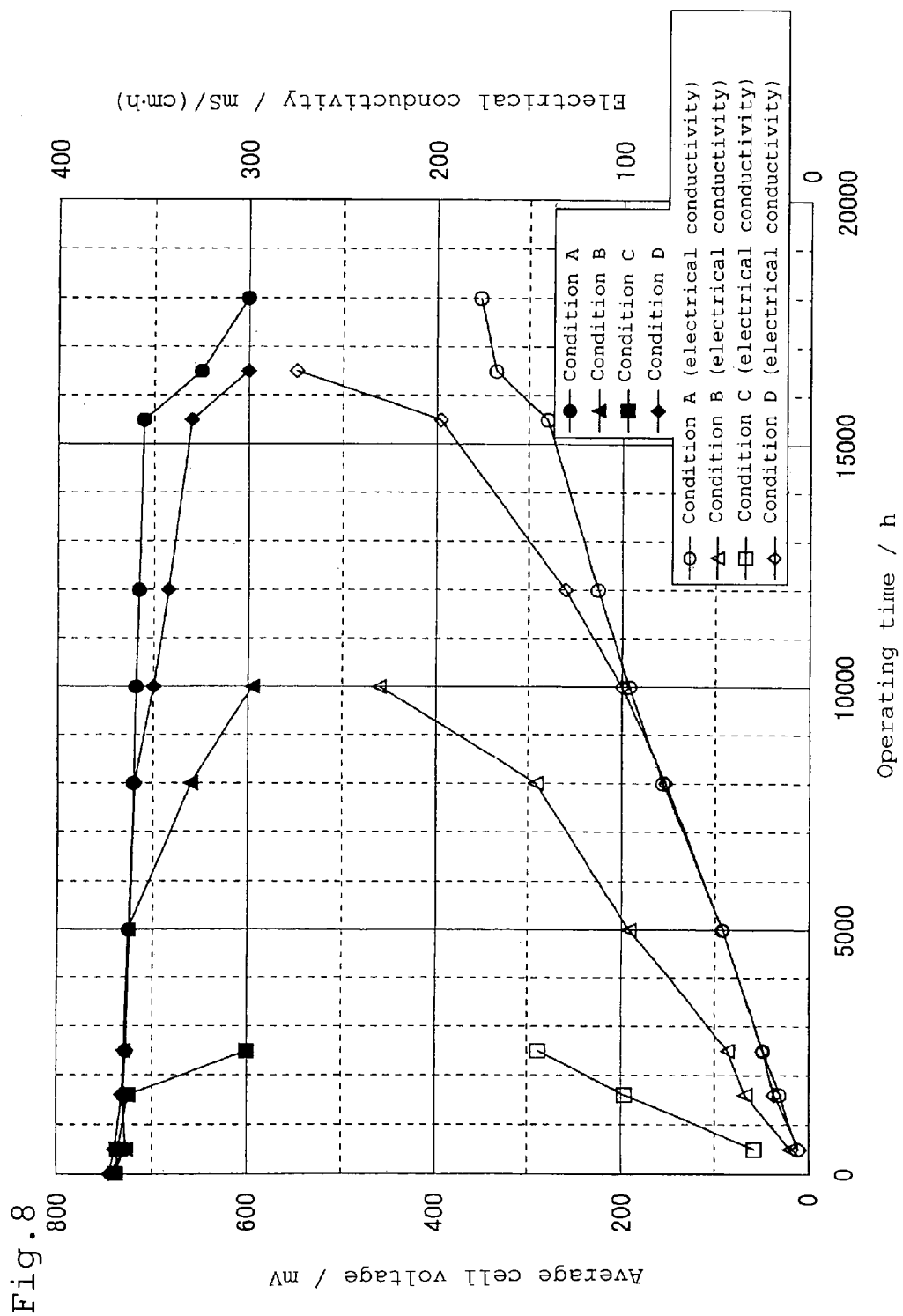
FIG. 8 is a graph illustrating another example of the characteristics of a fuel cell used in the fuel cell system according to the embodiment 2 of the invention.

FIG. 8 is a graph illustrating another example of the characteristics of the fuel cell used in the fuel cell system according to the embodiment 2 of the invention. In other words, FIG. 8 illustrates the electrical conductivity in FIG. 7 in the form of integrated value. As can be seen in FIG. 8, the integrated electrical conductivity at the time of the drop in the output voltage remains the same under any operating conditions. The integrated electrical conductivity at the time of the drop in the output voltage demonstrates that the integrated total amount of fluoride ions corresponds to about 30% of the amount of fluorine contained in the polymer electrolyte as shown in the embodiment 1 of the invention. In other words, the life of the fuel cell can be measured also by measuring the electrical conductivity of the drain water.

Accordingly, under the conditions A to C, in which the electrical conductivity remains almost the same, as a method of predicting the life of the fuel cell there can be derived the equation (2). The equation (2) will be again described below.

$$L=(B \times A \times F/S)-Lt \quad (2)$$

where
L: Remaining life (h) of fuel cell;
F: Weight (g) of F in polymer electrolyte membrane;
S: Electrical conductivity (S/cm/h);
A: Coefficient;
B: Correction coefficient;
Lt: Operating time (h)

In the aforementioned case, B is a coefficient of electrical conductivity and released amount of fluoride ions. In this case, B is 20,000. This correction coefficient varies with the kind, thickness and size of the polymer electrolyte membrane used, the kind and supported amount of the electrode catalyst, etc. similarly to the coefficient A. By thus measuring the electrical conductivity, the life of the fuel cell can be predicted. While the present embodiment has been described with reference to the case where the sum of the amount of fluoride ions in the anode waste gas and the cathode waste gas is used in calculation, any one of the anode waste gas and the cathode waste gas may be measured for electrical conductivity if the amount of the anode waste gas and the cathode waste gas are constant.

Under the condition D, the equation (2) cannot be used, but the life of the fuel cell can be judged by calculating the integrated electrical conductivity at regular intervals and comparing it with the amount of fluorine in the polymer electrolyte membrane using the correction coefficient B.

Accordingly, in the fuel cell system 23 of FIG. 6, the controlling portion 20 predicts the remaining life of the fuel cell 15 using the equation (2) under the conditions such that the electrical conductivity remains almost the same. However, the controlling portion 20 can use the aforementioned method to predict the life of the fuel cell even under the conditions such that the electrical conductivity is not constant.

In other words, in this case, the controlling portion 20 judges the life of the fuel cell by calculating the integrated electrical conductivity at regular intervals and comparing it with the amount of fluorine in the polymer electrolyte membrane using the correction coefficient B. For example, when the comparison of the integrated electrical conductivity calculated by the controlling portion 20 with the amount of fluorine in the polymer electrolyte membrane using the correction coefficient B shows that the integrated total amount of fluoride ions exceeds a predetermined proportion of fluorine in the polymer electrolyte membrane, the expiration of the life of the fuel cell is judged.

Thus, the method of predicting and operating the life of the polymer electrolyte fuel cell according to the present embodiment can be used as life predicting method and operating method in the case where a polymer electrolyte fuel cell is used as an electric supply for portable apparatus. These methods can be applied to the operation of fuel cell automobile, household fuel cell cogeneration system, etc. These methods are useful particularly for household fuel cell cogeneration system.

The program of the invention is adapted to execute the performance of the whole or one or more of a plurality of portions of the aforementioned fuel cell life predicting device of the invention by a computer. The program of the invention acts in cooperation with the computer.

The recording medium of the invention has a program supported thereon which is adapted to execute the performance of the whole or one or more of a plurality of portions of the aforementioned fuel cell life predicting device of the invention by a computer. The aforementioned program supported on the recording medium can be read by the computer. The program thus read by the computer executes the aforementioned performance in cooperation with the computer.

One of forms of application of the program of the invention may be such that the program is recorded in a recording medium readable by a computer and acts in cooperation with the computer.

Another form of application of the program of the invention may be such that the program is transmitted by a transmitting medium, is read by a computer and then acts in cooperation with the computer.

Examples of the recording medium include ROM. Examples of the transmitting medium include media such as internet, light, electrical radiation, and sound wave.

The aforementioned computer of the invention is not only a pure hardware such as CPU but may be also one comprising farm ware, OS and even peripheral devices.

As mentioned above, the constitution of the invention may be realized either in the form of software or in the form of hardware.

EXAMPLE

The invention will be further described in the following examples.

Example 1

The fuel cell 15 as shown in FIG. 2 was prepared.

In some detail, an electrode 9 with a catalyst layer comprising a gas diffusion layer 1 was attached to a polymer electrolyte membrane 3 (Nafion film having a thickness of 50 µm, produced by Du Pont Inc.) to prepare MEA 10.

MEA 10 was then disposed interposed between an air-tight carbon separator 4 and a gas sealing material 13 made of silicon rubber to form an elementary cell. Two units of such an elementary cell were then laminated to obtain a cell constituent unit from which a laminate of fuel cells having the configuration shown in FIG. 2 was then prepared. The total number of elementary cells laminated was 10. A gold-plated collector made of copper, an insulating plate made of an electrical insulating material and an end plate were then provided on the both ends of the laminate in this order to prepare a laminated cell 15.

The laminated fuel cell thus prepared 15 was then operated with hydrogen gas and air flowing into the fuel electrode and the air electrode, respectively, in such a manner that the temperature of cooling water is 75° C., the percent utilization of fuel is 80%, the percent utilization of air is 40% and the gas is moistened to provide the hydrogen gas and the air with a dew point of 75° C.

Figure 9:
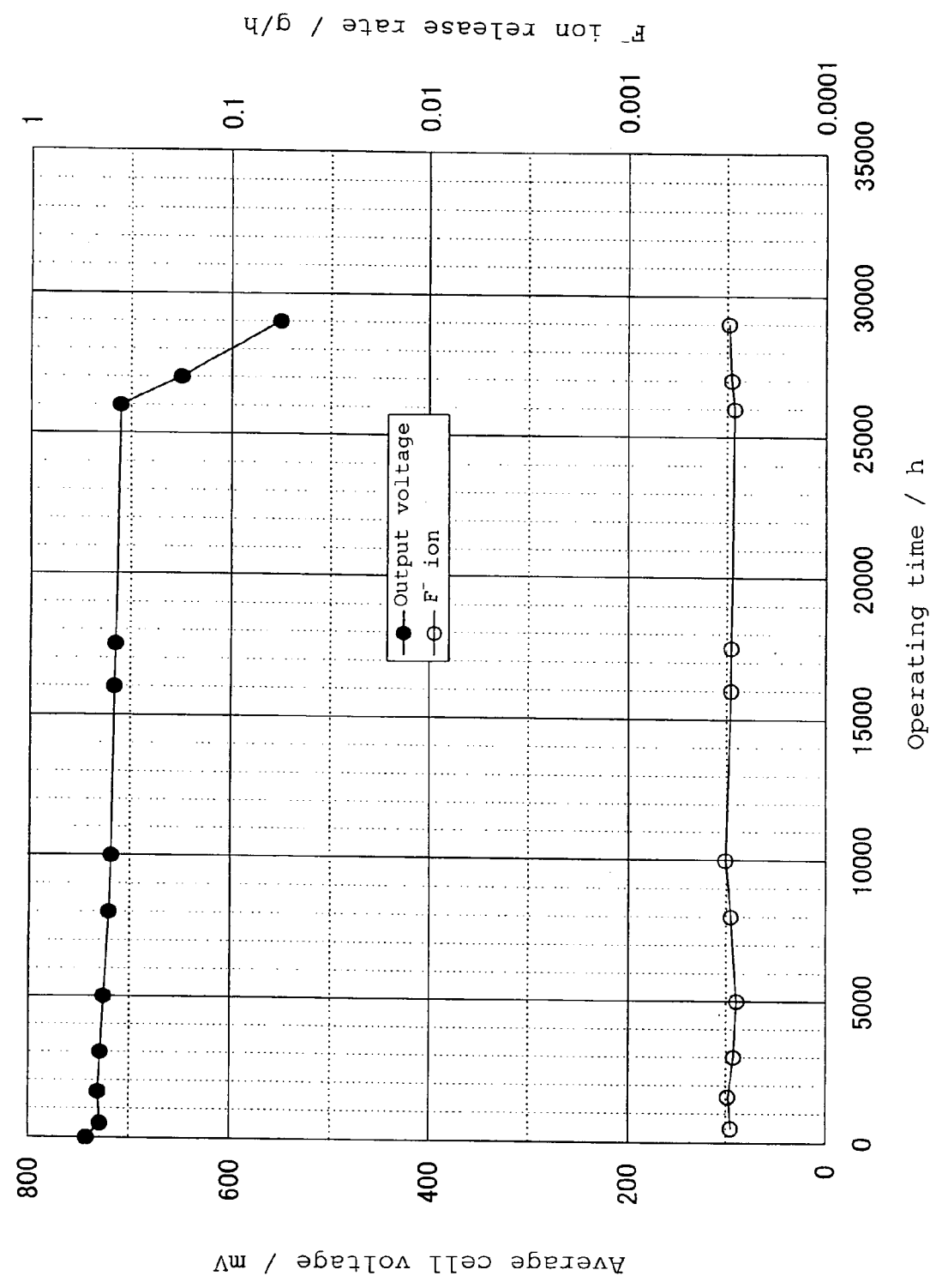
FIG. 9 is a graph illustrating an example of the characteristics of a fuel cell used in the fuel cell system according to an embodiment of the invention.

During this procedure, the anode waste gas and the cathode waste gas were passed through the drain tanks 16 and 17 having the configuration as shown in FIG. 3, respectively, to collect drain water. For the measurement of concentration of fluoride ions, a Type ICS-90 ion chromatogram (produced by Nippon Dionex Co., Ltd.) was used. The release rate was then calculated from the concentration of fluoride ions in the drain water. The output voltage and the rate of release of fluoride ions at this point are shown with respect to the operating time in FIG. 9. In other words, FIG. 9 is a graph illustrating an example of the characteristics of the fuel cell used in the fuel cell system according to an embodiment of the invention. As can be seen in FIG. 9, the rate of release of fluoride ions is 0.0003 g/h and the cell voltage shows a sudden drop at about 26,000 h. It is also made obvious that the total released amount of fluoride ions integrated until 26,000 h is about 8 g, which corresponds to about 25% of the total amount of fluorine in the polymer electrolyte if the proportion of fluorine in the polymer electrolyte membrane is 65%.

The same MEA as prepared above was then operated in the same manner as mentioned above except that the temperature of cell cooling water was raised to 95° C. During this procedure, the rate of release of fluoride ions was about 0.00045 g/h, which corresponds to about 1.5 times the case where the cell temperature is 80° C. When 3,000 h was elapsed, the life of the fuel cell was substituted in the equation (1) to predict the remaining life of the fuel cell.

$$L = (A \times F/V) - Lt \quad (1)$$

$$L = (0.25 \times 32.5 / 0.00045) - 3000 = 15{,}056 \text{ (h)}$$

Figure 10:
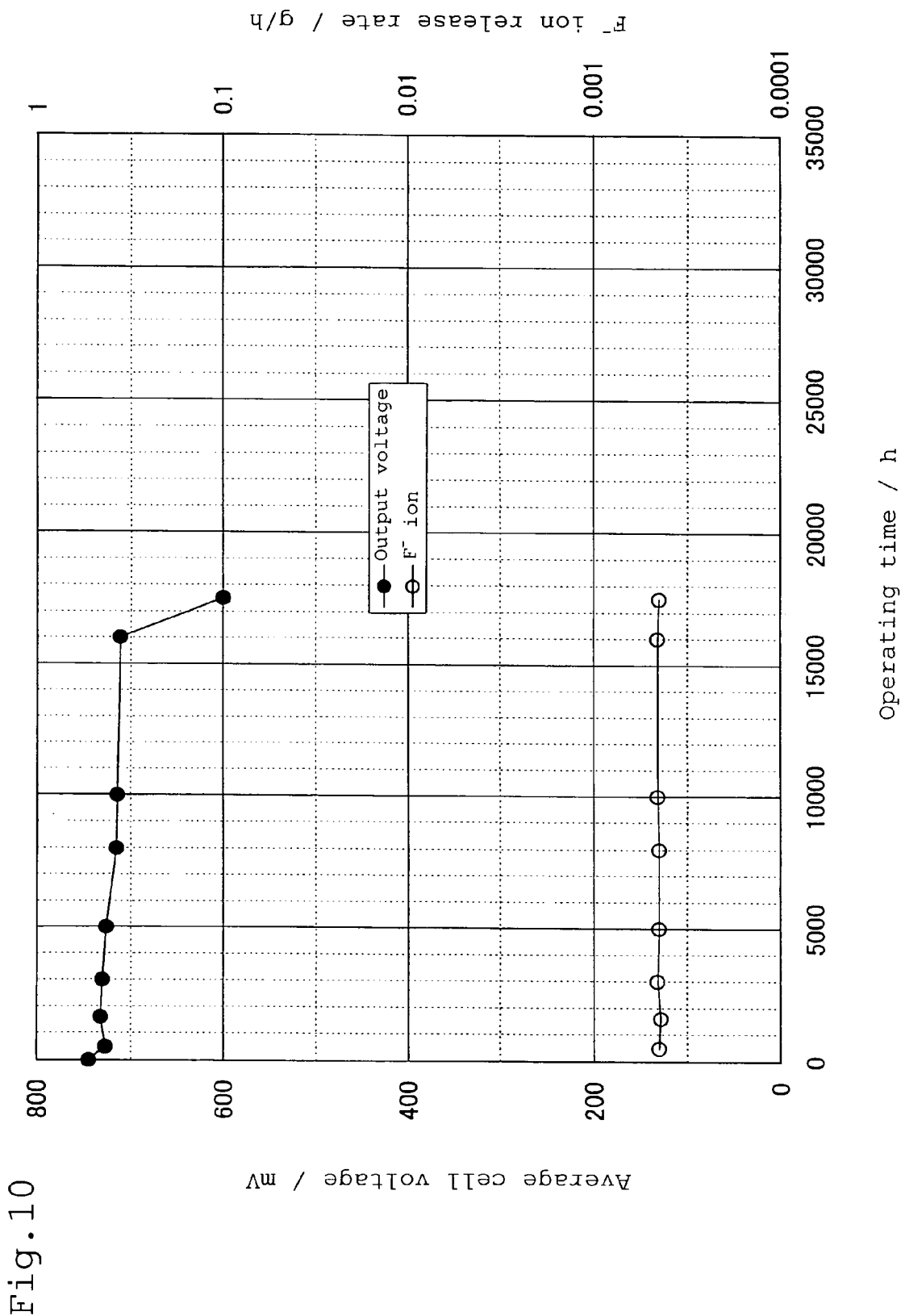
FIG. 10 is a graph illustrating another example of the characteristics of a fuel cell used in the fuel cell system according to an embodiment of the invention.

As a result, the remaining life was judged as 15,056 h. Then, the operation of the fuel cell was continued. As a result, the cell voltage showed a sudden drop at about 18,000 h as shown in FIG. 10. In other words, FIG. 10 is a graph illustrating another example of the characteristics of the fuel cell used in the fuel cell system according to the embodiment 1 of the invention. The results correspond almost to the predicted life, which is 3,000 h.

Figure 11:
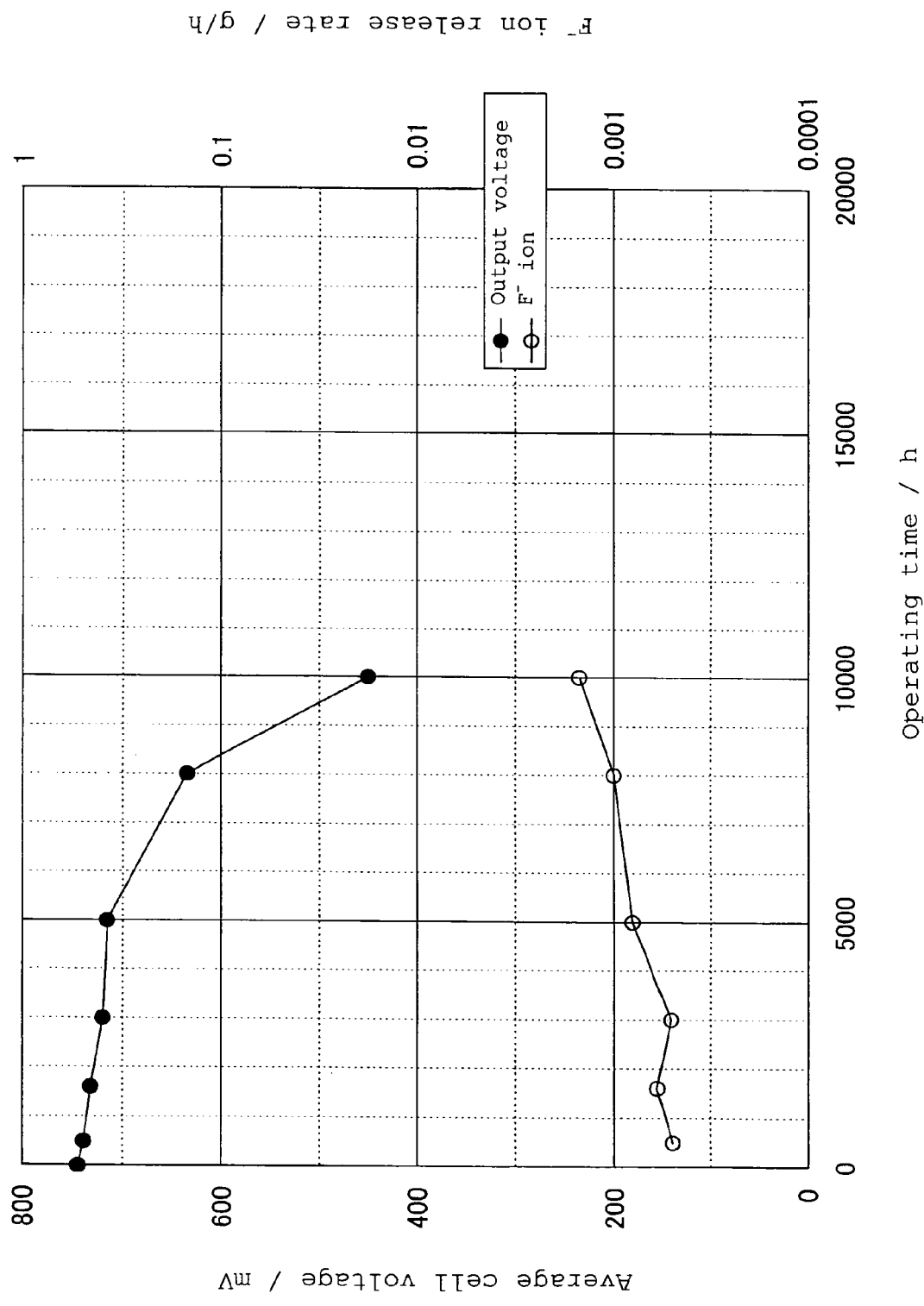
FIG. 11 is a graph illustrating a further example of the characteristics of a fuel cell used in the fuel cell system according to an embodiment of the invention.

Subsequently, the same MEA as prepared above was operated in the same manner as mentioned above except that the temperature of the cell cooling water was 90° C., the gas was moistened to provide both the cathode and anode gases with a dew point of 50° C. and hydrogen gas and oxygen were passed through the fuel electrode and the air electrode, respectively. The relationship between the output voltage and the rate of release of fluoride ions during this procedure is shown in FIG. 11. In other words, FIG. 11 is a graph illustrating a further example of the characteristics of the fuel cell used in the fuel cell system according to an embodiment of the invention. As can be seen in FIG. 11, the rate of release of fluoride ions rises with time. It is also made obvious that the amount of fluoride ions integrated until about 8,000 h, at which the cell voltage shows a sudden drop, corresponds to about 25% of the amount of fluorine in the polymer electrolyte. Thus, the life of the fuel cell can be predicted by measuring the integrated amount of fluoride ions.

While the present example has been described with reference to the case where the prediction of fuel cell life is conducted on the basis of the amount of fluoride ions integrated until the voltage of the fuel cell shows a sudden drop, the definition of life is not limited thereto. In other words, the life of the present example can be predicted by defining the time at which half the aforementioned amount of fluoride ions is released as life. Alternatively, in the case where the thickness or kind of MEA used is different, the prediction of life can be accordingly conducted. Thus, the definition of life is not limited to the present example.

Example 2

Subsequently, the same MEA as prepared in Example 1 was used to form a fuel cell system 22 shown in FIG. 1 which was then operated. As the F ion meter 19 there was used a Type Ti-5101 (produced by Toko Kagaku Kenkyusho) was used. It was arranged such that the signal of released amount of fluoride ions is passed to the controlling portion 20 and the remaining life is calculated using the aforementioned equation and then displayed on the remaining life meter. In this arrangement, the fuel cell can be operated while monitoring the remaining life thereof.

Another fuel cell system having the same configuration as mentioned above was provided with an alarm lamp. This fuel cell system was arranged such that when the remaining life of the fuel cell is 500 h, a primary alarm (yellow) is displayed, and when the remaining life of the fuel cell is 250 h, a secondary alarm (red) is displayed. In this arrangement, the life of the fuel cell can be previously detected, making it possible to take measures such as replacement of fuel cell previously.

A further fuel cell system having the same configuration as mentioned above was provided with an alarm buzzer. This fuel cell system was arranged such that when the remaining life of the fuel cell is 500 h, a primary alarm is sounded, and when the remaining life of the fuel cell is 250 h, a secondary alarm is sounded. In this arrangement, the life of the fuel cell can be previously detected, making it possible to take measures such as replacement of fuel cell previously.

A further fuel cell system having the same configuration as mentioned above was arranged such that when the remaining life of the fuel cell is 500 h, the output voltage of the cell is halved, and when the remaining life of the fuel cell is 250 h, the fuel cell system is automatically shut down. In this arrangement, the life of the fuel cell can be previously detected, making it possible to shut down the fuel cell system safely.

Subsequently, a fuel cell cogeneration system having the same configuration as mentioned above was operated free from F ion meter 19. During this procedure, the drain water was collected and measured for amount of fluoride ions using the same ion chromatograph as used in Example 1 every 4,000 h. The release rate thus determined was then used to predict the remaining life. The results were reflected on the operation of the fuel cell, making it possible to safely shut down the fuel cell before the predicted life. In the case where this method is used, the drain water is actually collected every time when the maintenance company performs regular maintenance to know and judge the life of the fuel cell. In this arrangement, the actual fuel cell operator can continue to operate the fuel cell free from fear without minding the life of the fuel cell.

Example 3

Figure 12:
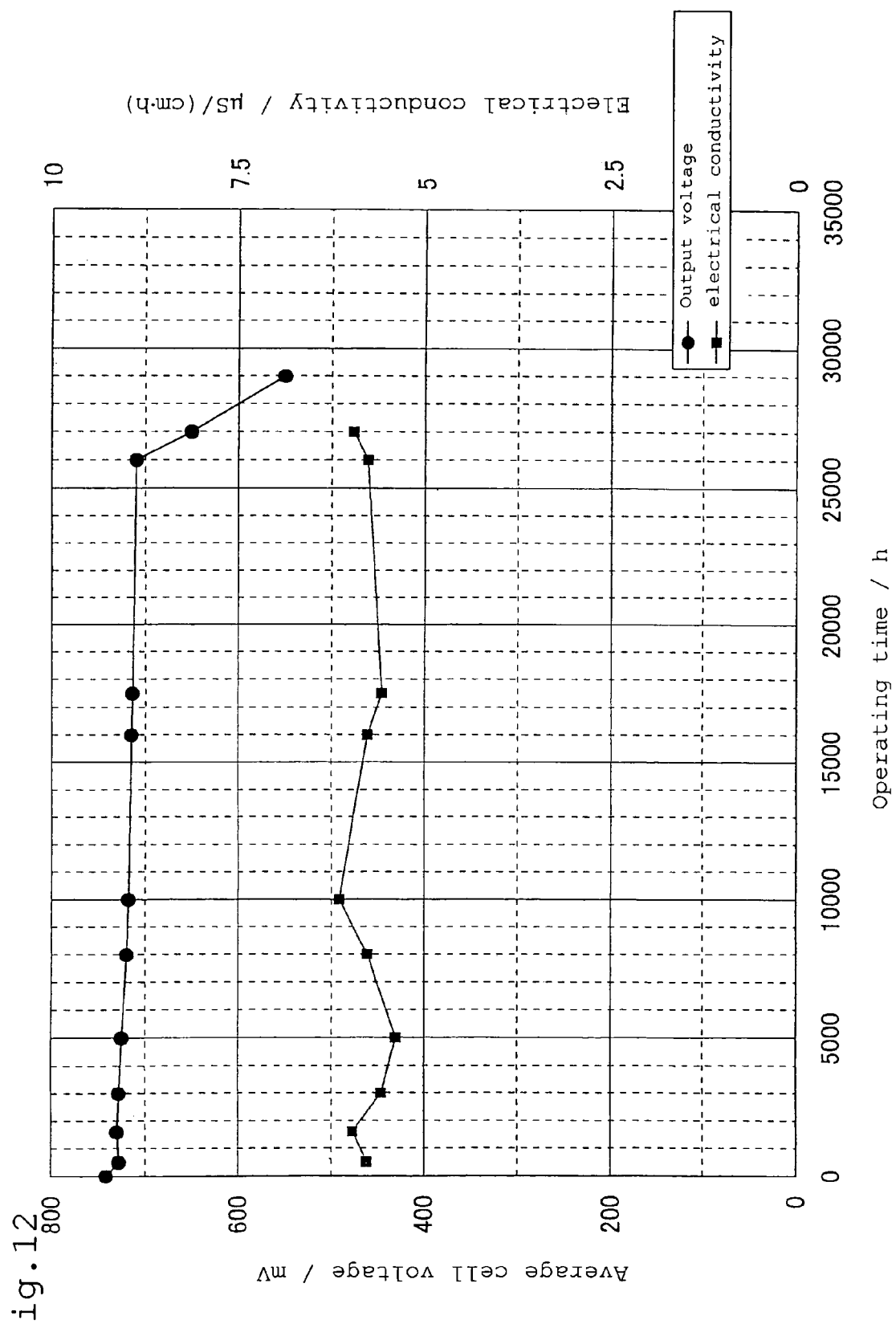
FIG. 12 is a graph illustrating a further example of the characteristics of a fuel cell used in the fuel cell system according to an embodiment of the invention.
Figure 13:
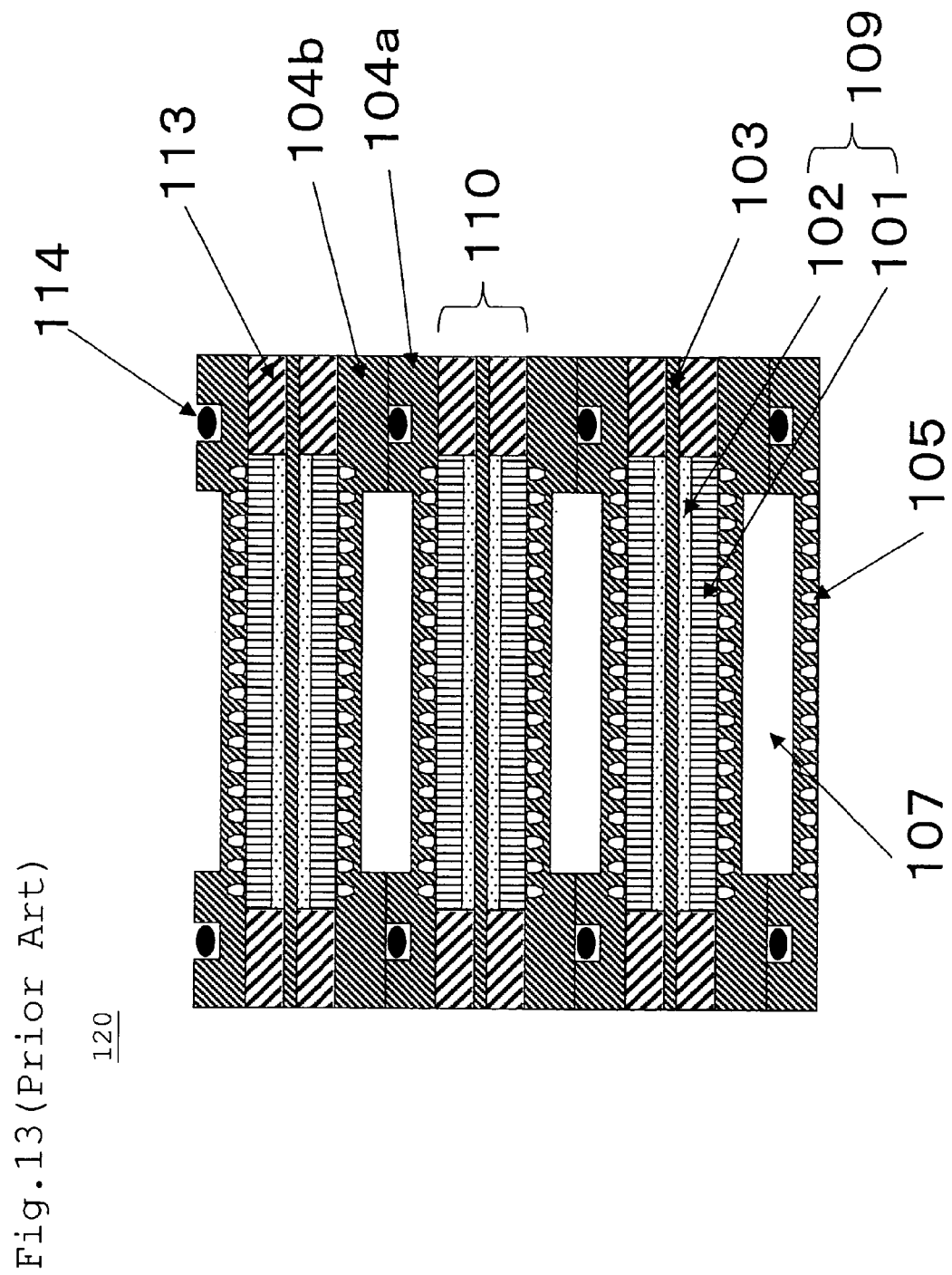
FIG. 13 is a schematic sectional view illustrating an ordinary configuration of the related art polymer electrolyte fuel cell.

Subsequently, the electrical conductivity of the drain water collected in Example 1 was measured using a Type B-173 electrical conductivity meter (produced by HORIBA, Ltd.). The electrical conductivity of the drain water produced when the fuel cell was operated with hydrogen gas and air flowing through the fuel electrode and the air electrode, respectively, in such a manner that the temperature of cooling water is 75° C., the percent utilization of fuel is 80%, the percent utilization of air is 40% and the gas is moistened to provide the hydrogen gas and the air with a dew point of 75° C. is shown in FIG. 12 with the output voltage of the cell previously measured. In other words, FIG. 12 is a graph illustrating an example of the characteristics of the fuel cell used in the fuel cell system according to an embodiment of the invention. As can be seen in FIG. 12, the electrical conductivity showed some dispersion from measuring time to measuring time, but the electrical conductivity per collecting time was about 5.5 μS/(cm·h). The electrical conductivity integrated until 26,000 h, at which the cell voltage showed a sudden drop, was 145 mS/cm.

Subsequently, the electrical conductivity of the drain water produced when the fuel cell was operated in the same manner as mentioned above except that the temperature of cooling water was raised to 95° C. was similarly examined. The electrical conductivity thus measured was about 8.3 μS/(cm·h), which is 1.5 times the aforementioned case where the temperature of the cell was 80° C. Then, the life of the fuel cell calculated from the measurements obtained at 3,000 h was substituted in the equation (2) to predict the remaining life of the fuel cell. The coefficient B in the equation (2) was calculated from the rate of release of fluoride ions in Example 1 and the coefficient of electrical conductivity in the present example as follows.

$$B \times 0.25 \times 32.5/5.5 = 26{,}000 \quad (2)$$

$$B = 17{,}600$$

$$\begin{aligned}L &= (B \times A \times F/S) - Lt \\ &= (17{,}600 \times 0.25 \times 32.5/8.3) - 3{,}000 \\ &= 14{,}229 \text{ (h)}\end{aligned}$$

The results correspond almost to the time at which the cell voltage showed a sudden drop as shown in FIG. 10, which is 17,500 h. Thus, even when electrical conductivity is used, the results obtained correspond almost to the life predicted at 3,000 h.

Example 4

Subsequently, the fuel cell system having the same configuration as in Example 2 was operated in the same manner as in Example 2 except that the F ion meter was replaced by the electrical conductivity meter as used in Example 3. The fuel cell system is shown in FIG. 6. The signal of electrical conductivity measured by the electrical conductivity meter 21 is passed to the controlling portion 20. The controlling portion 20 calculates the remaining life from this signal using the equation (2) and displays it on the remaining life meter. In this arrangement, the fuel cell system 23 can be operated while monitoring the remaining life thereof.

A further fuel cell system having the same configuration as mentioned above was provided with an alarm lamp. The fuel cell system was arranged such that when the remaining life of the fuel cell is 500 h, a primary alarm (yellow) is displayed, and when the remaining life of the fuel cell is 250 h, a secondary alarm (red) is displayed. In this arrangement, the life of the fuel cell can be previously detected making it possible to take measures such as replacement of fuel cell previously.

A further fuel cell system having the same configuration as mentioned above was provided with an alarm buzzer. This fuel cell system was arranged such that when the remaining life of the fuel cell is 500 h, a primary alarm is sounded, and when the remaining life of the fuel cell is 250 h, a secondary alarm is sounded. In this arrangement, the life of the fuel cell can be previously detected, making it possible to take measures such as replacement of fuel cell previously.

A further fuel cell system having the same configuration as mentioned above was arranged such that when the remaining life of the fuel cell is 500 h, the output voltage of the cell is halved, and when the remaining life of the fuel cell is 250 h, the fuel cell system is automatically shut down. In this arrangement, the life of the fuel cell can be previously detected, making it possible to shut down the fuel cell system safely.

Subsequently, a fuel cell cogeneration system having the same configuration as mentioned above was operated free from electrical conductivity meter 21. During this procedure, the drain water was collected and measured for electrical conductivity every 4,000 h. The release rate thus determined was then used to predict the remaining life. The results were reflected on the operation of the fuel cell, making it possible to safely shut down the fuel cell before the predicted life. In the case where this method is used, the drain water is actually collected every time when the maintenance company performs regular maintenance to know and judge the life of the fuel cell. In this arrangement, the actual fuel cell operator can continue to operate the fuel cell free from fear without minding the life of the fuel cell.

The fuel cell life predicting device and fuel cell system according to the invention have an effect of predicting the life of the fuel cell and allowing optimum operation of the fuel cell system and thus are useful as device of predicting the life of fuel cells, particularly polymer electrolyte fuel cells to be used in electric supply for portable apparatus, portable electric supply, electric supply for electric automobile, household cogeneration system, etc., fuel cell system or the like.

What is claimed is:

1. A fuel cell life predicting device for predicting the life of a fuel cell comprising at least a membrane-electrode assembly having an anode, a cathode and a polymer electrolyte membrane disposed interposed between said anode and said cathode,
   wherein there are provided a measuring device, which measures the amount of chemical species produced by the decomposition reaction of said polymer electrolyte membrane contained in the waste material discharged from said fuel cell during electricity generation, a life predicting device, which predicts the life of said fuel cell by the use of said amount of said chemical species measured by said measuring portion,
   wherein,
   said measuring portion measures the decomposed amount of said polymer electrolyte member by the use of said amount of said chemical species and,
   use of the formula:

$L=(A \times F/V)-Lt$ where
   L: Remaining life (h) of said fuel cell;
   F: Weight (g) of Fluorine is said polymer electrolyte membrane;
   V: Rate of release of said fluoride ions (g/h);
   A: Coefficient determined based on an integrated released amount of fluoride ions and an amount of fluorine in said polymer electrolyte membrane;
   Lt: Operating time of said fuel cell(h), and
   said polymer electrolyte membrane comprises a fluorine-containing polymer material incorporated therein as a constituent and said chemical species measured by said measuring portion are fluoride ions.

2. A fuel cell life predicting device for predicting the life of a fuel cell comprising at least a membrane-electrode assembly having an anode, a cathode and a polymer electrolyte membrane disposed interposed between said anode and said cathode,
   wherein there are provided a measuring device, which measures the electrical conductivity corresponding to the amount of chemical species produced by the decomposition reaction of said polymer electrolyte membrane contained in the waste material discharged from said fuel cell during electricity generation,
   a life predicting device, which predicts the life of said fuel cell by the use of said electrical conductivity measured by said measuring portion, and
   said measuring portion measures the electrical conductivity by use of the formula:

$L=(B \times A \times F/S)-Lt$

L: Remaining life (h) of said fuel cell;
   F: Weight (g) of F in said polymer electrolyte membrane;
   S: Electrical conductivity (μS/cm/h);
   A: Coefficient determined based on an integrated released amount of fluoride ions and an amount of fluorine in said polymer electrolyte membrane;
   B: Correction coefficient determined based on said electrical conductivity and said integrated released amount of fluoride ions;
   Lt: Operating time of said fuel cell (h).

3. A fuel cell system comprising the fuel cell life predicting device described in claim 1 or 2 and a fuel cell controlling portion for operation of said fuel cell.

* * * * *